(12) United States Patent
Buller et al.

(10) Patent No.: US 12,117,458 B2
(45) Date of Patent: Oct. 15, 2024

(54) LABORATORY INSTRUMENT AND INSERTABLE NETWORK INSTRUMENT

(71) Applicant: Eppendorf SE, Hamburg (DE)

(72) Inventors: Steffen Buller, Hamburg (DE); Andreas Thieme, Hamburg (DE); Michael Wild, Hamburg (DE)

(73) Assignee: EPPENDORF SE, Hamburg (DE)

( * ) Notice: Subject to any disclaimer, the term of this patent is extended or adjusted under 35 U.S.C. 154(b) by 0 days.

(21) Appl. No.: 16/614,324

(22) PCT Filed: May 15, 2018

(86) PCT No.: PCT/EP2018/062332
§ 371 (c)(1),
(2) Date: Nov. 15, 2019

(87) PCT Pub. No.: WO2018/210721
PCT Pub. Date: Nov. 22, 2018

(65) Prior Publication Data
US 2020/0150138 A1    May 14, 2020

(30) Foreign Application Priority Data
May 15, 2017  (EP) .................................. 17171128

(51) Int. Cl.
*G01N 35/00* (2006.01)
*B01L 1/00* (2006.01)

(52) U.S. Cl.
CPC .............. *G01N 35/00* (2013.01); *B01L 1/00* (2013.01); *G01N 35/00871* (2013.01); *G01N 2035/00881* (2013.01)

(58) Field of Classification Search
CPC ........ B01L 2200/147; B01L 1/00; B01L 7/00; B01L 2200/18; B01L 2300/0829; B01L 2300/023; B01L 9/523; G01N 35/00; G01N 2035/00881; G01N 35/00871
See application file for complete search history.

(56) References Cited

U.S. PATENT DOCUMENTS

| | | | |
|---|---|---|---|
| 2002/0090320 A1* | 7/2002 | Burow | B01L 9/523 422/561 |
| 2003/0215357 A1* | 11/2003 | Malterer | G01N 35/028 422/50 |
| 2011/0184536 A1* | 7/2011 | Tanoshima | G01N 35/00871 700/73 |

FOREIGN PATENT DOCUMENTS

| | | |
|---|---|---|
| JP | 2006-043569 A | 2/2006 |
| JP | 2006-049121 A | 2/2006 |
| JP | 2006-149232 A | 6/2006 |

(Continued)

*Primary Examiner* — Shogo Sasaki
(74) *Attorney, Agent, or Firm* — Todd Lorenz

(57) ABSTRACT

The invention relates to a laboratory instrument comprising a network interface apparatus (6), which is configured to provide, in the inserted position of the insertable instrument, a data connection between at least two network instruments of a laboratory instrument network (100), which network instruments are taken from the group of network instruments including at least a first control apparatus (4) of the laboratory instrument and the at least one insertable instrument (20; 30). The invention further relates to a laboratory instrument network including the laboratory instrument and a method for working on laboratory samples using the laboratory instrument network.

18 Claims, 6 Drawing Sheets

(56) References Cited

FOREIGN PATENT DOCUMENTS

| JP | 2008-200671 A | 9/2008 |
|---|---|---|
| WO | WO 94/11838 A1 | 5/1994 |

\* cited by examiner

LABORATORY INSTRUMENT AND INSERTABLE NETWORK INSTRUMENT

The invention relates to a laboratory instrument, a laboratory instrument network including the laboratory instrument and a method for working on laboratory samples using the laboratory instrument network.

Such laboratory instruments, connected in networks, are used in chemical, biological, biochemical, medical or forensic laboratories to treat laboratory samples with high efficiency. The network connection is used to exchange data between the laboratory instruments, for gathering and distributing information related to the laboratory samples or related to the working processes applied by the laboratory instruments. The data exchange between the instruments may also be used for performing a global task, which is divided into partial tasks and distributed to be locally executed by the individual laboratory instruments. Multiple instruments of the same network may fulfill similar tasks in parallel, or instruments of the same network may be assigned to perform different tasks.

A typical work step is carried out by a laboratory instrument on laboratory samples in a protected environment, typically a working chamber of the instrument, which provides a protective barrier between the protected environment and the outside. Laboratory samples are therefore, generally, transported from one working chamber of an instrument to the working chamber of another instrument of the laboratory instrument network for sequentially running different tasks on the samples. In order to increase the throughput of such a laboratory instrument network system, multiple instruments of the same network may be utilized to fulfill equal tasks in parallel, or individual instruments of the same network may also be configured complex enough to perform different tasks.

High throughput laboratory instruments are often automated to execute different work steps on the laboratory samples with a minimum of user interaction, e.g. by using control data received over the network, and the individual steps of sample treatment are typically controlled by computer programs, software, and robot systems. For this purpose, the laboratory instruments are typically configured to control different internal treatment apparatuses, which are integrated in the laboratory instruments and which represent the basic function of the laboratory instrument. For example, an automated pipetting station may include a pipetting robot for measuring and distributing liquids, a mixing device for mixing laboratory samples and a temperature control device for applying one or more temperatures to the laboratory sample, which are accessed and controlled by a control program of the laboratory instrument. While some applications of such laboratory instruments may require to sequentially treat the laboratory samples by each integrated treatment apparatus, other tasks my require only one, or a part of the integrated treatment apparatuses to be used, while the other treatment apparatuses may remain inactive over longer periods. The present invention provides a novel approach to increase the efficiency and flexibility of working on laboratory samples in a laboratory instrument network system.

It is the object of the present invention to provide a laboratory instrument, which allows a flexible and efficient use of the laboratory instrument network system, which includes the laboratory instrument, and a corresponding method for working on laboratory samples using a laboratory instrument network.

The invention achieves this object by means of, in particular, the laboratory instrument in accordance with claim 1, the laboratory instrument network system in accordance with claim 12 and the method according to claim 16. Preferred embodiments of the invention are, in particular, the subject matter of the dependent claims.

The laboratory instrument according to the invention provides a working chamber used as a protected environment to work on the samples, while being configured to allow insertable instruments be located inside the protected environment of the working chamber and still being connected by way of the network interface apparatus to the laboratory instrument network for allowing an exchange of data between the insertable instrument and the laboratory instrument network. The insertable instruments are exchangeable from the working chamber and may be placed and utilized in different or similar embodiments of the laboratory instruments according to the invention, and utilized by the same or different laboratory instrument networks. This allows assembling the laboratory instruments and insertable instruments to configure a laboratory instrument network in a flexible way, depending on the application. Preferably two or more insertable instruments are used and configured to perform different work steps for fulfilling different tasks.

The capability to exchange the data with the laboratory instrument network, in the inserted position of the insertable instrument, offers the advantage that any processing of the data, which may be generated by the insertable instrument inside the working chamber, does not have to take place inside the working chamber, but can be relocated to outside the working chamber, in particular into another network instrument. Hereby, heat dissipation caused by data processing does not affect the inside of the working chamber, and/or more powerful data processors may be used in an environment outside the working chamber, where a higher heat dissipation is acceptable.

A laboratory instrument network is understood to include a plurality of network instruments, which are connected to exchange data. Exchanging data includes sending and/or receiving data. The network instrument can be a laboratory instrument, an insertable instrument or a user interface apparatus, for example, which is described below. A network instrument may comprise a control apparatus, which controls at least one electrically controllable function of the network instrument. In the context of the present description, the term "first control apparatus" refers to the control apparatus of a laboratory instrument, the term "second control apparatus" refers to the control apparatus of an insertable instrument, and the term "third control apparatus" refers to the control apparatus of an external instrument, which is located outside of the laboratory instrument and which forms a part of the same laboratory instrument network. Such an external instrument can be another laboratory instrument or can be a user interface apparatus.

Preferably, the laboratory instrument network is configured to be a non-hierarchical network, in particular a peer-to-peer network. In a non-hierarchical network, each network instrument has the same communication capabilities and either network instrument can initiate a communication session. Unlike the client/server connections, in which the client makes a service request and the server fulfills the request, the present laboratory instrument network may be configured to allow a network instrument to communicate with another network instrument of the laboratory instrument network, in particular with another insertable instrument. According to a particular definition of a non-hierarchical network, having a hierarchy of at least two network instruments in the non-hierarchical laboratory instrument network is possible, as long as at least two network instruments in the non-hierarchical laboratory instrument network are configured to relate to each other non-hierarchically.

Moreover, connecting the insertable instrument to a non-hierarchical laboratory instrument network via the network interface apparatus provides the advantage, inter alia, that polling is not required for integrating the insertable device in a workflow. Instead, the communication between the laboratory instrument network, or the laboratory instrument, and the insertable instrument can be event-driven, can be initiated by the insertable instrument and can be a peer-to-peer communication. Thereby, the data communication between the insertable instrument and the laboratory instrument network can be remarkably reduced compared to systems which utilize polling.

Preferably, the laboratory instrument network may be connected for a data exchange by a star shaped network topology. The laboratory instrument network may be configured such that the addresses, in particular the IP addresses, for addressing the network instruments of the laboratory instrument network, may be determined dynamically, and preferably by implementing DNS SD (Domain Name Service Service Discovery) in the laboratory instrument network. This way, a network capable for hot-plug may be realized. Hot plug is the addition of a component to a running laboratory instrument network without significant interruption to the operation of the laboratory instrument network. In particular, hot plugging a network instrument does not require a restart of the laboratory instrument network.

A network instrument may also be represented by a control apparatus of one of said instruments, the first, second or third control apparatus, for example, the first, second or third control apparatus.

Preferably, the laboratory instrument network uses an Ethernet network and/or the network interface apparatus is an Ethernet hub or an Ethernet switch, which is respectively configured to be used in an Ethernet network. Ethernet provides several advantages, like hot-plugging of network instruments to the network, comfortable addressing techniques, easy connection to external networks like the internet due to established standards. An Ethernet network, in terms of the present invention, describes a network, which uses at least the physical layer, also generally described as OSI (Open Systems Interconnection) model layer 1, and preferably also the data layer, also generally described as OSI model layer 2, implemented by Ethernet technology, as it is generally known from the industry norm IEEE-Norm 802.3. Preferably, the internet protocol (IP) is implemented as network layer, i.e. OSI model layer 3, to provide e.g. logical addressing.

The laboratory instrument according to the invention may include one or more of the following configurations and may be equipped with the following network instruments: In each configuration it is preferred that said network instruments communicate via the network interface apparatus, which is a part of the laboratory instrument, and which is, in particular, integrated into the laboratory instrument, in particular firmly mounted or mounted as a module in the laboratory instrument. Herein, the network interface apparatus may be configured to provide, in the inserted position of the insertable instrument, a data connection between at least two network instruments of a laboratory instrument network, which network instruments may be taken from the group of network instruments including at least the first control apparatus, the at least one insertable instrument, and preferably at least one external network instrument.

In a first preferred configuration (a), the laboratory instrument comprises at least one insertable instrument, and the network interface apparatus is configured to provide, in the inserted position of the insertable instrument, a data connection between at least two network instruments of a laboratory instrument network, including at least the first control apparatus and one or more insertable instruments. Such a configuration allows that the laboratory instrument, in particular the first control apparatus, communicates with the one or more insertable instruments, which are connected to the network interface apparatus and preferably arranged in the working chamber of the laboratory instrument.

The first control apparatus may be configured to execute one or more functions in dependence on data which were provided by the insertable instrument, in particular the second control apparatus assigned to the insertable instrument, and which were received via the laboratory instrument network. The first control apparatus may be configured to execute a control program, also referred to as a first control program, in particular for controlling the program-controlled treatment of the at least one laboratory sample, in dependence on data, which were provided by the one or more insertable instrument and were received via the laboratory instrument network. In an example, the insertable instrument may comprise a measurement device, in particular a sensor, e.g. an environmental sensor or an optical sensor for digital image acquisition, wherein the environmental data or the image data are taken by the control program and stored in a data memory according to the instructions of the control program. Moreover, the data may be utilized to influence the treatment of the at least one laboratory sample, e.g. by heating or cooling the working chamber in dependence on the environmental data or the image data.

Moreover, the second control apparatus of an insertable instrument may be configured to execute one or more functions in dependence on data which were provided by the first control apparatus and which were received via the laboratory instrument network. The second control apparatus may be configured to execute to perform the work step on the at least one laboratory sample, in particular a program-controlled work step, in dependence on data, which were provided by the first control apparatus and which were received via the laboratory instrument network. For example, the insertable instrument, or respectively its second control apparatus, may be configured to run a control program, also referred to as a second control program, which uses the data provided by the first control apparatus via the laboratory instrument network. The control program may include instructions, which control the measurement device and/or a working apparatus in dependence on said data for performing the work step on the at least one laboratory sample.

In a second preferred configuration (b), the laboratory instrument comprises at least one first insertable instrument and one second insertable instrument, and the network interface apparatus is configured to provide, in the inserted position, a data connection between at least two network instruments of a laboratory instrument network, including at least the first and second insertable instrument. Such a configuration allows a data communication between two or more insertable instruments of the laboratory instrument network, which are connected to the network interface apparatus and preferably arranged in the working chamber of the laboratory instrument, wherein said communication may be independent from the function of the laboratory instrument, which houses the insertable instruments. For example, a first insertable instrument may be a shelf, which may comprise a program controlled movement mechanism for shaking at least one laboratory sample, which is positioned on the shelf. The second insertable instrument may comprise a measurement device for perform a program controlled measurement of at least one parameter of the at least one laboratory sample, e.g. capture an image of the sample or measure the humidity inside the working chamber. The program executed by the control apparatus of the second insertable instrument may perform the work step, here the measurement in dependence on the data provided by the shelf, which may include information whether or not and/or a shaking process was started or ended, or time information related thereto, such that the measurement may be performed before the shaking process is started or after it stopped.

In a third preferred configuration (c), the laboratory instrument comprises at least one insertable instrument, and the laboratory network also includes at least one external network instrument, and the network interface apparatus is configured to provide, in the inserted position of the insertable instrument, a data connection between at least two or three network instruments of the laboratory instrument network, including the at least one network instrument located outside the laboratory instrument, which is also referred to as external network instrument and which is connected to the network interface apparatus, and further including (i) the first control apparatus and/or (ii) at least one insertable instrument inserted into the working chamber.

Such a configuration allows that the external network instrument communicates with one or more insertable instruments located inside the working chamber of a laboratory apparatus, in particular without communicating with the control apparatus of the same laboratory instrument. For example, the external network instrument may be the first control apparatus of a second laboratory instrument, or a user interface apparatus, which may be part of the second laboratory instrument. As an example, one or more functions of the insertable instrument in the working chamber of the first laboratory apparatus may be controlled by the control apparatus of a second laboratory instrument or an (external) user interface apparatus. As another example, any status data of laboratory samples or the environmental data measured by an insertable instrument in the working chamber of the first laboratory apparatus may be received by the external network instrument.

Moreover, such a configuration allows that the external network instrument communicates with the first control apparatus, such that one or more functions of the laboratory instrument may be controlled by the external network instrument. At the same time, the interaction between the external network instrument and the laboratory instrument may be independent on the functions executed by the at least one insertable instrument, which may be inserted into the working chamber. For example, the treatment executed by the laboratory instrument may be remote controlled by the external network instrument, while a data communication between the first control apparatus and the at least one insertable instrument may take place independent or dependent from the treatment, and while the external network instrument may or may not exchange data with the at least one insertable instrument, which may be inserted into the working chamber. For example, the first control apparatus may autonomously control a process of data acquisition performed by the insertable instrument, e.g. image data or other measurement data, while a treatment of samples is initiated and/or controlled from the external network instrument.

The laboratory instrument according to another preferred embodiment is configured such that the network instruments of the laboratory instrument network are limited to only include either the first control apparatus and at least one insertable instrument inserted into the working chamber, or to only include at least two insertable instruments inserted into the working chamber. For example, the network interface apparatus may be, in general, permanently connected to the network interface apparatus, e.g. by an Ethernet connection. The laboratory instrument network may configured to be inaccessible for any external network instruments, for example by omitting any interfaces for offering a data connection to external devices and by only offering interfaces of the network interface apparatus for offering a data connection to internal devices, i.e. the at least one insertable instrument, located in the working chamber. Such a configuration is sufficient for a stand-alone laboratory instrument, where data connection to external laboratory instruments is not required. In any case, the technology using a network connection between the first control apparatus and the at least one insertable instrument offers a hot plug capability of inserted instruments, and allows a self-configuration of the insertable instruments, which is not possible for many other technologies for data transfer, for example when using a CAN bus.

The laboratory instrument is a network instrument for working on laboratory samples using a data exchange within a laboratory instrument network. A user interface apparatus, being a network instrument, may be part of the laboratory instrument network. The user interface apparatus may be a stand-alone network instrument. In another embodiment, the user interface apparatus may be mechanically connected to a laboratory instrument, preferably being releasably connected, e.g. by a fixation mechanism, to form an exchangeable module of the laboratory instrument. The user interface apparatus may be integrated in a laboratory instrument, thereby forming a part of the same. In case that the user interface apparatus is a module or is mechanically connected or integrated in a laboratory instrument, the user interface apparatus may contain the first control apparatus of the laboratory instrument and/or may contain the first communication apparatus of the laboratory instrument. In this case, the third control apparatus and the first control apparatus are the same apparatus, and preferably also the third communication apparatus and the first communication apparatus are the same. A number of insertable instruments may be network instruments of the same laboratory instrument network.

The user interface apparatus, preferably, comprises the network interface apparatus.

In another typical scenario, a number of the network instruments of the laboratory instrument network is accessed by a user interface apparatus being a network instrument of the laboratory instrument network. The user interface apparatus may be used by a first user, for example, to plan and/or schedule a global work process for processing the laboratory samples, which are processed using the number of network instruments, including one or more laboratory instruments and one or more insertable instruments. The first data, transferred from the to the network instruments to the user interface apparatus may contain information on the availability of the network instruments. For example, a number of laboratory instruments may be occupied by the currently running working process initiated by a second user, which means that the respective laboratory instruments may be unavailable, at least temporarily. The first data may contain information on the availability of the network instruments with regard to a time schedule and/or any resource information, e.g. a maintenance status, the supply with consumables required for a network instrument, e.g. pipettes, containers, sample media, solutions, chemicals, etc. Hereinafter, "first data" preferably are data send from or received by an external network instrument. The term "second data" may be used to describe data, which are exchanged with an insertable instrument, in particular between insertable instruments of the same laboratory instrument or exchanged between an insertable instrument and the first control apparatus of the same laboratory instrument.

Moreover, the treatment performed by the treatment apparatus of a laboratory instrument may involve the exchange of first data within the laboratory instrument network. Hereby, the first data may define parameters or program parameters for performing an instrument-controlled treatment. For example, the laboratory instrument may utilize first data, which define the steps of a treatment, which is to be performed by the respective treatment apparatus during the instrument-controlled treatment. Such steps may include the automatic pipetting, and/or temperature adjustment, and/or mixing, and/or magnetic separation, and/or centrifugation, and/or irradiation, in particular with UV light, and/or illumination, and/or physical or chemical analysis of the laboratory samples. The first data may also contain information on physical parameters which characterize the treatment of the laboratory samples, e.g. physical parameters characterizing the atmosphere inside a working chamber, also referred to as environmental data. Such physical parameters may include the temperature inside the working chamber, in case that the laboratory instrument is an incubator, or a cooling device like a fridge or freezer, or the humidity and/or $CO_2$ content, which may be relevant for an incubator.

A working chamber, preferably, is formed as a cuboid, in which each of the face sides is a rectangle. A face side may be formed by a wall, which may be substantially planar. However, the working chamber may also have a substantial cylindrical, oval, or spherical shape. A laboratory instrument may have exactly one working chamber, but it is also preferred that a laboratory instrument has two or more than two working chambers. Typically in the case of a cuboid working chamber, the front lateral face sides provides at least one opening, which can be closed by at least one door panel, which is typically hinged to a border region of the frame, which surrounds the at least one opening. A typical size of such an incubator chamber is between 50 and 400 litres. The working chamber, preferably is made from a metal or comprises a metal surface facing the inner space of the working chamber. Such metal may be a substantially non-corrosive metal, e.g. stainless steel. The material of at least one wall or of each wall may comprise or be composed of metal, in particular stainless steel or copper, or a polymer.

The working chamber may contain a holding frame for holding one or more shelves. A shelf is used to increase the storage area available inside the working chamber, for allowing the treatment of a larger number of laboratory samples. The holding frame may be exchangeable from the working chamber.

The network interface apparatus of a laboratory instrument preferably comprises an interface apparatus, for connecting at least one insertable instrument with the network interface apparatus. The interface apparatus may comprise one or multiple sockets, e.g basically of the type RJ-45, for connecting a data cable, preferably an Ethernet cable, preferably a Cat5 or Cat6 Ethernet cable, with the interface apparatus of the network interface apparatus. Another end of the data cable may be connected or connectable with the interface apparatus of at least one insertable instrument, in the inserted position, or may be permanently connected with at least one insertable instrument. At least one socket, or one socket, or each socket, may also be configured to serve as the power supply for the at least one insertable instrument in the inserted position. The electrical current may be transferred via the data cable or a dedicated power line, when the insertable instrument is connected with the laboratory instrument for being power supplied.

Preferably, the network interface apparatus is connected with the first communication apparatus for allowing the exchange of the first data between the first control apparatus and the laboratory instrument network. The communication apparatus may include a network adapter, which, preferably, implements the electronic circuitry required to communicate using a specific physical layer and data link layer standard such as Ethernet. The network adapter allows the network instruments to communicate over the laboratory instrument network, either by using cables or wirelessly. The network adapter preferably is both a physical layer and data link layer device, such that it provides physical access to a networking medium and, for example for IEEE 802 and similar laboratory instrument networks, provides a low-level addressing system through the use of physical addresses that are uniquely assigned to network adapters.

Preferably, the network interface apparatus includes, or is, a network switch or a network hub. Preferably, the network interface apparatus comprises a network router configured to connect the laboratory instrument network with an external network, preferably a customer's intranet, a company intranet, or the internet.

The laboratory instrument is electrically powered. Therefore, a part of the energy consumption of the laboratory instrument may be distributed to the at least one insertable instrument in the inserted position, when the insertable instrument is connected with the laboratory instrument for being power supplied. Preferably, the laboratory instrument comprises a power management device for measuring and controlling the electrical power, which is used by the at least one insertable instrument. Thereby, the energy consumption of the at least one insertable instrument can be controlled and/or the waste heat, emitted by the at least one insertable instrument into the working chamber can be controlled. The latter is useful, for example, for the laboratory instrument being an incubator or freezer, for example, which require a defined temperature inside the working chamber.

The interface apparatus of the network interface apparatus is typically arranged in contact with or integrated into a front wall, rear wall or side wall of the working chamber, preferably the rear wall of the working chamber, which opposes the front wall. Further preferred, the interface apparatus is arranged in contact with or integrated into the front wall of the working chamber, or a lateral side wall. Preferably, the interface apparatus comprises a connector for connecting a data transfer cable or a combined data transfer and power support cable. The interface apparatus of the network interface apparatus may also preferably be arranged in contact with or integrated into a front wall, rear wall or side wall of the housing of the laboratory instrument, preferably a side wall of the housing, or the front wall.

It is also possible and preferred that the second data are exchanged between the network interface apparatus of the laboratory instrument and the at least one insertable instrument by a wireless technique, e.g. by radio transmission or optical data exchange. The network interface apparatus may be configured to provide a wireless local area network (WLAN) inside the working chamber. In this case, the insertable instrument preferably has a wireless network adapter, which may be part of a communication apparatus of the insertable instrument.

Preferably, the laboratory instrument is configured for locating the presence or absence, and/or at least one position of the at least one insertable instrument, in the inserted position of the insertable instrument. Therefore, the network interface apparatus preferably is a network switch, in particular an Ethernet switch. The network switch provides the information, which network instrument, in particular which insertable instrument, is connected to a specific port of the network switch. Using the predetermined information on the geographic position of a port placed along the network interface adapter, the latter being preferably placed inside the working chamber in a predetermined arrangement, allows to obtain a correlation between a specific network device, which may be identified via its physical address, and the geographic position of the same.

Preferably, the laboratory instrument is configured to determine position data representing the relative position of the one or more insertable instruments inside the working chamber of the laboratory instrument, preferably including operating an Ethernet switch using a Serial Peripheral Interface (SPI). A position, preferably, is represented by an identifying code, in particular a number, which may be assigned each interface apparatus—in particular a connector, also called a port—of the network interface apparatus. SPI may be used to allow the exchange of control data, also referred to as meta-data, between the first control apparatus and the network interface apparatus, in some preferred embodiments of the laboratory instrument according to the invention. The position data, which is exchanged as metadata, may comprise information on the port of the Ethernet switch, which is used when a specific insertable instrument is connected to the Ethernet switch. The control apparatus or the Ethernet switch may store such information in a memory, e.g. in the form of a table, which correlates the physical MAC address with an Ethernet port number of the Ethernet switch. Furthermore, a Simple Network Management Protocol, or Tail Tagging may be used to determine position data. Preferably, the Ethernet switch is a Micrel® Ethernet switch or comprises such a switch for using tail tagging.

The insertable instrument is to be inserted into the working chamber, in an inserted position, and is configured to perform a work step related to the laboratory samples involving the exchange of second data within the laboratory instrument network.

The wording "being inserted into the working chamber" is, according to a first preferred definition, understood to mean that the insertable instrument is inserted at least in part into the working chamber. For example, the insertable instrument may comprise at least a first part and a second part, which may be connected with each other for the purpose of data exchange, in particular by being connected by a cable. The first part may be inserted into the working chamber in the inserted position of the insertable instrument, and the second part may be not inserted into the working chamber in the inserted position of the insertable instrument. In particular, the second part may be arranged outside the working chamber in the inserted position of the insertable instrument. For example, the second part may be arranged outside the working chamber and be arranged inside another chamber. This other chamber may be a second working chamber, or a hollow space of the laboratory instrument, for example a port, which may connect the working chamber with the surrounding of the laboratory instrument.

The wording "being inserted into the working chamber" is, according to a second preferred definition, understood to mean that the insertable instrument is inserted completely into the working chamber.

The wording "being inserted into the working chamber" is, according to a third preferred definition, understood to mean that the insertable instrument is inserted into the working chamber while at least one door panel or all door panels of the working chamber are closed.

The wording "being inserted into the working chamber" is, according to a fourth preferred definition, understood to mean that the insertable instrument has first connection means, which are configured to mate with second connections means, which are provided inside the working chamber, and that the first and second connections means are connected in a connected position of the first and second connection means, in the inserted position of the insertable instrument. For example, the first and second connecting means may be configured to engage by means of a positive-fit connection and/or by being releasably locked to each other in the inserted position of the insertable instrument.

The definitions of the wording "being inserted into the working chamber" may also be used in combination, wherein each possible combination results in a preferred configuration of the laboratory instrument. For example, it is preferred that a multi-part insertable instrument is in part inserted into the working chamber, while the door panel is closed. This may be achieved by a port provided in the door panel or in a wall panel constituting the working chamber, or by way of letting the cable displace a deformable seal member being arranged between the closed door panel and a wall panel.

Furthermore, "being inserted" includes the understanding that the insertable instrument may be removed from the working chamber, for example by releasing a connection of the insertable instrument with the working chamber or with a part located inside the working chamber, for example a rack for holding the at least one insertable instrument.

Preferably, the insertable instrument comprises a second control apparatus for processing the second data and/or for controlling the work step, and/or a measurement device and/or a working apparatus to perform the work step related to the laboratory samples, and/or a second communication apparatus configured to exchange, in the inserted position, the second data between the second control apparatus and the laboratory instrument network. The second communication apparatus may be a part or be implemented by the control apparatus, which may include integrated circuits.

The insertable instrument is configured to generate and/or store and/or send/receive data. Preferably, the insertable instrument is a program controlled instrument. For the purpose of unambiguously identifying the insertable instrument in the laboratory network, it is preferred that the insertable instrument has an identifying property, e.g. an identifying code, which can be included in the data, at least on demand. The identifying code may be a unique physical address, e.g. a media access control address (MAC address), which is a unique identifier assigned to network interfaces for communications on the physical network segment.

The insertable instrument, preferably, has an interface assembly for connecting the insertable instrument with the network interface apparatus of the laboratory instrument. The interface assembly may comprise one or more plugs or sockets to provide said connection using a cable. The interface assembly may comprise one or more cables for providing said connection. Alternatively or additionally, the interface assembly may be, or include, a wireless network adapter for implementing a wireless exchange of the data.

The insertable instrument may contain a battery for powering the functions of the insertable instrument, including the operation of any possible measurement device and/or working apparatus, and/or the second control apparatus and/or the second communication apparatus.

The insertable instrument, preferably, has at least one measurement device, which is configured to measure at least one measurement parameter inside the working chamber, thereby performing the work step of measuring. For this purpose, the measurement device may include at least one sensor for measuring the measurement parameter. Preferably, the insertable instrument is a measurement device. The at least one measurement parameter may be used by the insertable instrument to form the second data. The measurement parameter, preferably, may characterize the at least one laboratory sample placed inside the working chamber, and/or characterize the working chamber or the atmosphere inside the working chamber, e.g. the temperature of a wall of the working chamber or the temperature of the atmosphere, the humidity, the concentration of a gas, e.g. $CO_2$, inside the working chamber.

The measurement parameter may characterize a physical property of one or more laboratory samples, e.g. a sample temperature, volume, emitted or transmitted light intensity, the pH-value.

In a preferred embodiment, the measurement device comprises an imaging sensor, in particular a CCD or CMOS sensor. In this case, the second data are picture or movie data, which are provided to the laboratory instrument network for the further evaluation. A dataset collected by an imaging sensor is referred to as "image". The dataset preferably contains values of light intensity, which are recorded by the imaging sensor at different locations of the light sensitive elements of the imaging sensor. The image may contain a real optical image of cells, while this is not mandatory the case for all images according to the understanding of the term "image" regarding the present invention. The camera may comprise an optical system focusing on a target area. The optical system may be a microscopic system. It may have a fixed focus or a variable focus. Such an optical measurement device may be used to monitore the growth of living cells or bacteria, in particular for the purpose of a quantitative evaluation of the picture data, e.g. by partile or cell counting, and/or volume determination of the particles or cells.

In a preferred embodiment, the insertable instrument is an optical camera instrument, comprising the optical measurement device.

Preferably, the insertable instrument is a carrier device for carrying at least one laboratory sample, and the working chamber is configured to receive the at least one carrier device. The carrier device may be a drawer for being pushed and pulled into/out of the working chamber, a frame for holding sample containers and/or other laboratory equipment, in particular a frame for roller bottles. Preferably, the carrier device is a shelf having a shelf surface to be horizontally arranged and mounted in the working chamber.

In a preferred embodiment, the insertable instrument is a shelf, which can be inserted into the working chamber to act as a support for the laboratory samples and, preferably, for other sample processing equipment and/or devices. Preferably, the shelf includes at least one measurement device, which is permanently mounted to the shelf or connectable to the shelf, and which may generate the second data. The shelf may include the second control apparatus and/or the second communication apparatus. Moreover, the shelf may include a working apparatus, which is configured to perform a work step related to the laboratory samples involving the exchange of second data within the laboratory instrument network. The shelf may also comprise a second network interface apparatus, e.g. a network switch or hub, for allowing additional insertable instruments to be connected to the laboratory instrument network via the second network interface apparatus.

A working apparatus of an insertable instrument, in particular a shelf, may comprise a movement mechanism for generating the motion of a moving part inside the working chamber. Generating the movement is the work step performed by the insertable instrument, in this case. The movement mechanism may include an electric motor. Such a movement mechanism can be or comprise a rotor for moving and/or heating and/or cooling an stream of fluid inside the working chamber using, e.g., a rotor as the moving part. For example, a ventilator may be provided to move air, or a pump may be provided to move liquid. Moreover, a movement mechanism may be or include a drive mechanism for generating the oscillation motion of a movable platform, which may be a support platform for carrying the laboratory samples. Such an oscillating platform can be used for mixing sample solutions or shaking laboratory samples. The drive mechanism may include electromagnetic coils for generating a driving force. Moreover, a movement mechanism may be or include a magnetic drive mechanism for rotating a magnetic stir bar, which may be arranged by a user in a sample container containing also the laboratory sample to be stirred.

A working apparatus, in particular a movement mechanism, may be controlled by the second control apparatus of the insertable instrument. The second data, involved in the operation of a working apparatus, in particular of a movement mechanism, may include the control data for controlling the working apparatus, in particular for controlling a driving voltage, current or power output. The second control device may be configured to measure the power demand of the working apparatus. The information on the power demand may be provided as the second data.

The insertable instrument, or respectively the second control apparatus, may include a data processing unit and/or a data storage device for storing the second data. The second communication device, preferably, is configured to receive the second data from the data storage device and provide the second data to the laboratory instrument network, which means to any network instrument connected to the laboratory instrument network.

A working apparatus may also contain a lamp for irradiating at least a part of the working chamber, in particular with UV-light, which is useful for the sterilization of the working chamber, or for irradiating one or more other insertable instruments, which are inserted inside the working chamber. A working apparatus may also contain a lamp for illuminating at least a part of the working chamber, in particular illuminating the laboratory samples. The illumination may be used to initiate or catalyze photoactive chemical processes inside the laboratory samples, to provide the light required for optically measuring or monitoring the laboratory samples, or to change the temperature of one or more laboratory samples by absorption of the light energy and transforming the same to heat.

Preferably, the insertable instrument is a calibration device for assisting the calibration of one or more parameters of the laboratory instrument, in particular a parameter for operating the treatment apparatus of the laboratory instrument. For example, the treatment apparatus of the laboratory instrument, which may be a freezer or incubator, for example, may be configured to provide at least a predetermined or user defined temperature within the working chamber. This is usually achieved by one or more control loop system associated to the control apparatus of the laboratory instrument. A control loop system may be an open loop control system or an closed loop control system, the latter also called a feedback control system. In a feedback control system, a control loop, including one or more sensors, one or more control algorithms and one or more actuators, is arranged in such a way as to try to regulate a variable at a setpoint or reference value. For implementing a temperature adjustment as a treatment of the laboratory samples, the actuator of the feedback control system is a temperature adjusting device, e.g. a heating and/or cooling device, e.g. a Peltier device, and the sensor is a temperature sensor placed in thermal contact with the inside of the working chamber. The preciseness of the sensor will influence the performance of the laboratory instrument. Therefore, calibration is used, typically by a maintenance technician, to compensate for any errors or drifts of the sensor performance. The insertable instrument, being a calibration device, preferably contains a sensor, which is more reliable and precise than the sensor used inside the control loop system of the control apparatus of the laboratory system. Such a solution is efficient, because one calibration device can be used on time, when required, and can be used for different laboratory instruments.

The insertable instrument, in particular a calibration device, preferably has at least a first part and a second part, which are connected to each other, preferably by a cable or cable bundle. The first part is inserted into the working chamber and the second part is not inserted in the working chamber in the inserted position of the insertable instrument. Thereby, a minimum interference of the atmosphere inside the working chamber is achievable.

The invention is also related to the laboratory instrument network comprising at least one network instrument, in particular at least one laboratory instrument according to the invention and/or the at least one insertable instrument, which is configured to be inserted into the working chamber of the laboratory instrument according to the invention and be removed from said working chamber, and which is configured to perform the work step related to the laboratory samples using the second data exchanged within the laboratory instrument network, wherein the at least one laboratory instrument and the at least one insertable instrument are connected by way of the laboratory instrument network to enable the exchange of data, in particular the first and/or second data, in the inserted position of the at least one insertable instrument. Preferably, the laboratory instrument network uses an Ethernet network.

Preferably, the laboratory instrument network, in particular the laboratory instrument, in particular the network interface apparatus, comprises a network router to connect the laboratory instrument network to an external network, preferably the internet.

Preferably, the laboratory instrument network is configured, for the purpose of addressing a network instrument, in particular a laboratory instrument or an insertable instrument, to have a link-local address be assigned to each network instrument, which is connected to the laboratory instrument network, the link-local address preferably being a link-local IP address of an Ethernet network. A dynamic configuration of IPv4 Link-Local addresses may be provided, preferably according to RFC 3927, when using IPv4, or according to RFC 7404, when using IPv6.

Preferably, the laboratory instrument network, and/or preferably the laboratory instrument, contains a network router and a network switch, which are configured to implement at least one Virtual Local Area Network (VLAN), in particular one internal VLAN, which connects the network instruments, in particular the at least one laboratory instrument and/or the at least one insertable instrument, and, preferably, one external VLAN, which hides the network instruments connected by the internal VLAN against an external network.

The invention is also related to a method for working on laboratory samples using a laboratory instrument network comprising at least one laboratory instrument according to the invention and at least one insertable instrument, which is configured to perform a work step related to the laboratory samples involving the exchange of second data within the laboratory instrument network, including the steps: —placing at least one insertable instrument in the working chamber of the at least one laboratory instrument; —connecting the at least one insertable instrument with the network interface apparatus of the at least one laboratory instrument to enable the data exchange between the at least one insertable instrument and the laboratory instrument network. Further optional and preferred embodiments of the method according to the invention may be derived from the description of the laboratory instrument according to the invention and the laboratory instrument network, including their respective preferred embodiments.

The term laboratory instrument denotes, in particular, an instrument which is embodied for instrument-controlled treatment of at least one laboratory sample and which is embodied for use in a laboratory. This laboratory can be, in particular, a chemical, biological, biochemical, medical or forensic laboratory. Such laboratories serve for research and/or analysing laboratory samples, but can also serve for the manufacture of products by means of laboratory samples or the manufacture of laboratory samples.

A laboratory instrument is preferably one of the following laboratory instruments and/or is preferably embodied as at least one of the following laboratory instruments: a laboratory incubator, also referred to as "incubator" within the scope of the description of the present invention; a laboratory freezer, also referred to as "freezer" within the scope of the description of the present invention; a thermocycler, also referred to as "cycler" within the scope of the description of the present invention; a laboratory sample shaker, also referred to as "shaker" within the scope of the description of the present invention; a laboratory mixer, also referred to as "mixing device"; a laboratory machine for treating fluid samples, in particular a pipetting machine.

In a preferred embodiment of the invention, the laboratory instrument is a laboratory incubator. A laboratory incubator is an instrument by means of which controlled climatic conditions for various biological development and growth processes can be set up and maintained. It serves to set up and maintain a microclimate with regulated gas and/or humidity and/or temperature conditions in an incubator space, wherein this treatment may be dependent on time.

The laboratory incubator is not, in terms of the present invention, a neonate incubator, i.e. an apparatus used to maintain environmental conditions suitable for a neonate. Neonate incubators are related to a different technical field, which is not related to the present invention.

The laboratory incubator, in particular the treatment apparatus of the laboratory incubator, may, in particular, comprise a timer, in particular a timer switch, and/or a heater/cooling apparatus and preferably a setting for regulating a substitute gas supplied to the incubator space, in particular fresh air, and/or a setting apparatus for the composition of the gas in the incubator space of the laboratory incubator, in particular for setting the $CO_2$ and/or $O_2$ content of the gas and/or a setting apparatus for setting the humidity in the incubator space of the laboratory incubator.

The laboratory incubator, in particular the treatment apparatus of the laboratory incubator, comprises, in particular, at least one incubator chamber forming the at least one working chamber of the incubator, furthermore preferably a control apparatus with at least one control loop, to which at least one heater/cooling apparatus is assigned as an actuator and at least one temperature measurement apparatus is assigned as a measurement member. The temperature can be regulated in the incubator by means of the controlling system.

$CO_2$ incubators serve, in particular, for cultivating animal or human cells. Incubators may have turning devices for turning the at least one laboratory sample and/or a shaker apparatus for shaking or moving the at least one laboratory sample.

The instrument-controlled treatment of the at least one laboratory sample may correspond to a climate treatment in a laboratory incubator, with at least one sample being subjected to said treatment. Preferably, first data, including parameters, in particular program parameters, in particular user parameters, which are used to influence a climate treatment, define, in particular, the temperature of the incubator space, in which the at least one sample is incubated, the $O_2$ and/or $CO_2$ partial pressure in the incubator interior, the humidity in the incubator interior and/or at least one progress parameter, which influences or defines the progress, in particular the sequence, of a incubation treatment program consisting of a plurality of steps.

A working chamber, here an incubator chamber, typically, is formed by a cuboid, in which each of the face sides is a rectangle. However, the working chamber may also have a substantial cylindrical, oval, or spherical shape. Typically, the front lateral face sides provides at least one opening, which can be closed by at least one door panel, which is typically hinged to a border region of the frame, which surrounds the at least one opening. A typical size of such an incubator chamber is between 50 and 400 litres.

In a preferred embodiment, the insertable instrument of a laboratory incubator according to the invention is a carrier device, in particular a shelf.

The network interface apparatus of an incubator preferably comprises an interface apparatus, for connecting at least one insertable instrument with the network interface apparatus. The interface apparatus is typically arranged in contact with or integrated into a face side of the working chamber, preferably the back lateral face side of the working chamber, which opposes the front side. Further preferred, the interface apparatus is arranged in contact with or integrated into the front face side of the working chamber, or a lateral face side.

A laboratory freezer serves for storing at least one laboratory sample in a freezer room at regulated temperatures, in particular in the freezer range from −18° C. to −50° C. or in the ultra-freezer range from −50° C. to −90° C. In particular, a laboratory freezer is not a refrigerator, which can be used for cooling at temperatures in the range from 0° C. to 10° C. or from −10° to 10° C. in particular.

A laboratory freezer, in particular the treatment apparatus of the laboratory freezer, comprises, in particular, at least one cooling apparatus and at least one regulation apparatus with at least one control loop, to which the at least one cooling apparatus is assigned as an actuator and at least one temperature measurement apparatus is assigned as a measurement member.

A laboratory freezer, in particular the treatment apparatus of the laboratory freezer, comprises, in particular, a monitoring measurement instrument for measuring the temperature and/or in particular at least one alarm apparatus, by means of which an alarm signal is emitted if the temperature measured in the freezer space departs from a permitted temperature range.

A laboratory freezer, in particular the treatment apparatus of the laboratory freezer, can, in particular, comprise an information reader for reading information. This information can be contained in an information medium which can be connected to an article. This article can, in particular, be a sample container which can contain at least one laboratory sample. The information medium can, in particular, comprise an RFID chip or other identification features, such as e.g. a barcode, a data matrix code, a QR code, which can be read by suitable methods.

The instrument-controlled treatment of the at least one laboratory sample corresponds to a low-temperature treatment in a laboratory freezer, with at least one sample being subjected to said treatment. Possible parameters, in particular program parameters, in particular user parameters, which are used to influence a low-temperature treatment, define, in particular, the temperature of the freezer space, in which the at least one sample is frozen and/or the information read process, which is preferably carried out when an article provided with an information medium is transferred from a user into the laboratory freezer. Such parameters may form or may be included in the first data.

The working chamber of a laboratory freezer is, preferably, the freezer room; the insertable instrument, preferably, is a carrier device, in particular a shelf.

A thermocycler is an instrument that is able, successively in time, to set the temperature of at least one sample to a predetermined temperature and to keep said sample at this temperature level for a predetermined duration. The progress of this temperature control is cyclical. That is to say, a predetermined temperature cycle, i.e. a sequence of at least two temperature levels, is carried out repeatedly. This method serves, in particular, for performing a polymerase chain reaction (PCR). In this context, a thermocycler is sometimes also referred to as a PCR block.

A thermocycler, in particular the treatment apparatus of the thermocycler, preferably has a thermoblock. A thermoblock is a sample holder made of a heat-conducting material, usually a metal-containing material or a metal, in particular aluminium or silver. The sample holder comprises a contacting side which is contacted by at least one heater/cooling apparatus of the thermocycler, in particular by a Peltier element.

The thermocycler, in particular the treatment apparatus of the thermocycler, comprises a regulation apparatus with at least one control loop, to which the at least one heater/cooling apparatus is assigned as an actuator and at least one temperature measurement apparatus is assigned as a measurement member. The temperature is regulated to a temperature level by means of the controlling system. A cooling body of the thermocycler, in particular of the treatment apparatus of the thermocycler, serves for cooling sections of the thermocycler, in particular for cooling the Peltier elements. The thermocycler, in particular the treatment apparatus of the thermocycler, may comprise further heater and/or cooling elements.

The thermocycler, in particular the treatment apparatus of the thermocycler, preferably comprises a timer apparatus, by means of which time parameters for setting the temperature cycle can be controlled. The instrument-controlled treatment of the at least one laboratory sample corresponds to a temperature cycle treatment in a thermocycler, with at least one sample being subjected to said rotational treatment. Possible parameters, in particular program parameters, in particular user parameters, which are used to influence a temperature cycle treatment, define, in particular, the temperature of a temperature level, the duration of a temperature level, the control of further heater and/or cooling elements and/or the number of temperature levels or cycles and/or at least one progress parameter, which influences or defines the progress, in particular the sequence, of a temperature monitoring program consisting of a plurality of steps. Said parameters may form, or may be included in, the first data.

A thermocycler includes a movable cover for covering the thermoblock, including the laboratory samples, inside a covered space, in the closed position of the cover, thereby protecting the space against external interferences, which may result, e.g., in temperature disturbances or sample contamination. The insertable instrument may be a thermoblock, which is removable from the working chamber formed by the covered space, in the opened position of the cover.

A laboratory shaker serves for moving a laboratory sample, in particular for mixing a laboratory sample comprising a plurality of constituents. There are different embodiments of laboratory shakers, in particular overhead shakers or flatbed shakers. Laboratory shakers can comprise a temperature control function for controlling the temperature of at least one laboratory sample and can, in particular, comprise an incubator function for incubating the at least one laboratory sample in controlled climatic conditions. Laboratory shakers, in particular the treatment apparatus thereof, can, in particular, be configured to perform an oscillating motion on a sample container holder, e.g. a supporting platform or sample rack.

Laboratory shakers, in particular the treatment apparatus thereof, comprise, in particular, a drive for driving the motion, comprise, in particular, a timer apparatus, by means of which time parameters of the setting of the shaker treatment can be controlled and, in particular, comprise at least one heater/cooling apparatus and at least one control apparatus with at least one control loop, which is assigned the at least one heater/cooling apparatus as actuator and at least one temperature measurement apparatus as measurement member. The instrument-controlled treatment of the at least one laboratory sample corresponds to a shaker treatment in a laboratory shaker, with at least one sample being subjected to said treatment. Possible parameters, in particular program parameters, in particular user parameters, which are used to influence a shaker treatment, define, in particular, the movement intensity, in particular the movement frequency in the case of an oscillating drive, of a time period during the shaker treatment and/or at least one progress parameter, which influences or defines the progress, in particular the sequence, of a shaker treatment program consisting of a plurality of steps. Said parameters may form, or may be included in, the first data. Laboratory shakers include a working chamber for housing the laboratory samples. The insertable instrument of a laboratory shaker may be a carrier device.

A laboratory mixer, also referred to as "mixing device", serves like the laboratory shaker for moving a laboratory sample, in particular for mixing a laboratory sample comprising a plurality of constituents. Compared to a laboratory shaker, a laboratory mixer enables movements with higher frequencies, in particular with higher rotational speeds. Laboratory mixers, in particular the treatment apparatus thereof, can, in particular, be configured to perform an oscillating motion on a sample container holder, e.g. a supporting platform or sample rack.

Laboratory mixers, in particular the treatment apparatus thereof, comprise, in particular, a drive for driving the motion, comprise, in particular, a timer apparatus, by means of which time parameters of the setting of the mixer treatment can be controlled and, in particular, comprise at least one heater/cooling apparatus and at least one control apparatus with at least one control loop, which is assigned the at least one heater/cooling apparatus as actuator and at least one temperature measurement apparatus as measurement member. The instrument-controlled treatment of the at least one laboratory sample corresponds to a mixer treatment in a laboratory mixer, with at least one sample being subjected to said treatment. Possible parameters, in particular program parameters, in particular user parameters, which are used to influence a mixer treatment, define, in particular, the movement intensity, in particular the movement frequency in the case of an oscillating drive, of a time period during the mixer treatment and/or at least one progress parameter, which influences or defines the progress, in particular the sequence, of a mixer treatment program consisting of a plurality of steps. Said parameters may form, or may be included in, the first data. Laboratory mixers include a working chamber for housing the laboratory samples. The insertable instrument of a laboratory shaker may be a carrier device.

A laboratory machine for treating fluid samples, in particular an automated pipetting apparatus, serves for the program-controlled treatment of these samples. A laboratory machine can be a laboratory instrument or comprise at least one laboratory instrument of the aforementioned type and/or can be embodied to carry out at least one, some or all of the treatments that can be executed by this aforementioned laboratory instrument.

A laboratory machine comprises the treatment apparatus for automatic, program-controlled treatment of the at least one laboratory sample, wherein the treatment is controlled by using a plurality of program parameters, which are at least partly selected by the user. In the process, the sample can, for example, be moved and/or transported by the laboratory machine or a treatment apparatus of the laboratory machine. The movement can be brought about by transport in movable sample containers or by guidance through tube systems, capillaries or pipette tips. Here, liquid samples are, in particular, transported by suction, i.e. by pipetting, or, more generally, by the application of pressure differences.

By way of example, a sample can be divided or diluted by a treatment of the sample. The contents of a sample can be analysed or it is possible, e.g. by way of a chemical reaction, for new contents to be produced, in particular by using the sample. In the context of, in particular, handling and analysing DNA or RNA or the constituents thereof, laboratory machines aid in obtaining a wealth of information within a suitable period of time or in analysing many such samples. This treatment apparatus of a laboratory machine usually comprises a worktop with workstations, on which samples can be handled or stored in various ways.

For the purposes of transporting e.g. liquid samples between various positions, in particular sample containers, the treatment apparatus usually comprises an instrument-controlled movement device and an instrument-controlled fluid-transfer apparatus, which can e.g. comprise a pipetting system. Both the transport of the samples and the treatment thereof at the various stations can be carried out in an instrument-controlled manner, in particular in a program-controlled manner. Then the treatment is preferably at least partly or completely automated. Any parameters required for the sample treatment may form, or may be included in, the first data. Laboratory machines include a working chamber for housing the laboratory samples. The insertable instrument of a laboratory shaker may be a carrier device, in particular a shelf.

The laboratory machine can be modified in such a way that it can be used to perform further treatment types. This can be brought about by virtue of the files and/or programs or program constituents required for this, in particular a program module mapped to the treatment type, being subsequently transmitted to the laboratory machine, in particular the storage apparatus thereof.

A laboratory sample is a sample which can be treated in a laboratory. Instead of the term laboratory sample, the term "sample" is also used in the description of the invention. The sample can be a fluid. The sample can be liquid, gel-like, powdery or a solid-state body or comprise such phases. The sample can be a mixture of such phases, in particular a liquid mixture, a solution, a suspension, e.g. a cell suspension, an emulsion or dispersion. A solution is a homogeneous mixture of at least two substances. A liquid sample can be of a type which is usually handled in a biological, chemical or medical laboratory. A liquid sample can be an analysis sample, a reagent, a medium, a buffer etc. A solution has one or more dissolved solid, liquid or gaseous substances (solutes) and furthermore comprises a preferably liquid solvent which, in particular, forms the greater portion or greatest portion of the volume which forms the solution. The solvent may itself be a solution.

A sample container can be an individual container, in which only a single sample is contained, or it can be a multiple container, in which a plurality of individual containers connected to one another are disposed.

A single container can be an open container or a sealable container. In the case of a sealable container, provision can be made for a covering element, in particular a sealing cap. The covering element can be securely connected to the container, e.g. as a hinged cover or hinged closure cap, or can be used as separate component.

In a multiple container, the plurality of single containers are preferably disposed in a fixed position with respect to one another, in particular in accordance with the crossing points of a grid pattern. This simplifies the automated approach to the positions and, in particular, the individual addressing of samples. A multiple container can be embodied as plate element, in which the individual containers are connected in such a way that they form a plate-shaped arrangement. The individual containers can be embodied as depressions in a plate or can be interconnected by web elements. The plate element can have a frame element, in which the single containers are held. These connections between components can be integral connections, i.e. cohesive connections and/or connections generated by a common injection moulding process, or they can be generated in a force-fit and/or form-fit manner. In particular, the plate element can be a microtiter plate.

Multiple containers can comprise a plurality (2 to 10) of single containers. They can furthermore comprise a multiplicity (more than 10) thereof, typically 12, 16, 24, 32, 48, 64, 96, 384, 1536 single containers. In particular, the multiple container can be a microtiter plate. A microtiter plate can be embodied in accordance with one or more industrial standards, in particular the industrial standards ANSI/SBS 1-2004, ANSI/SBS 2-2004, ANSI/SBS 3-2004, ANSI/SBS 4-2004.

The maximum sample volume that can be held by a transport container or sample container typically lies between 0.01 ml and 100 ml, in particular 10-100 μl, 100-500 μl, 0.5-5 ml, 5-25 ml, 25-50 ml, 50-100 ml, depending on the type of selected transport container or sample vessel.

The treatment of a laboratory sample or samples can contain one or more of the processes specified below, in particular simultaneously or in succession:

transport of the laboratory sample, in particular by a transport apparatus, under the action of gravity and/or a force caused by the laboratory machine;

a contactless (non-invasive) physical treatment of the sample, in particular a thermal treatment, in particular heating and/or cooling, in particular controlling the temperature of the sample; or freezing or defrosting of the sample or a different thermal induction of a phase change of the sample, e.g. evaporation, condensation, etc.; a magnetic treatment of the sample; an optical treatment of the sample, in particular irradiating the sample with radiation, in particular light, in particular visible light, infrared light or UV light or detection of such radiation, in particular fluorescence light, from this sample; a magnetic treatment of a sample with magnetic constituents, in particular magnetic separation of magnetic constituents, in particular "magnetic beads", from a liquid phase of the sample; moving the sample, i.e. performing a mechanical treatment of the sample, in particular shaking, rotating, oscillating, vibrating, centrifuging, an acoustic treatment, in particular with ultrasound, in each case e.g. for the purpose of mixing the sample or of separating constituents within the sample or of transporting the magnetic constituents out of the sample or into the sample;

invasive physical treatment of the sample, i.e. performing a mechanical treatment of the sample: introducing stirring tools, e.g. stirring bar or magnetic stirrer bar, into the sample and stirring, introducing a sonotrode for acoustic or ultrasonic treatment, introducing transport means, in particular transport containers, into the sample, e.g. dispenser tip or pipette tip or hollow needle or tube; adding other auxiliary means into the sample;

chemical, biochemical or biomedical treatment of the sample: adding chemical (e.g. reactant, reagent, solvent, solute), biochemical (e.g. biochemical macromolecules, e.g. DNA, DNA constituents; pharmaceutical active ingredients) or biomedical (blood, serum, cell medium) substances;

storing the sample, in particular for a period of time defined in a program-controlled manner, in particular under specific physical conditions, e.g. at a specific temperature, temperatures or temperature changes, in particular repeated temperature changes, e.g. cyclically and/or periodically repeated temperature changes and/or setting a surrounding pressure, e.g. applying positive pressure or negative pressure, in particular a vacuum, and/or setting a defined surrounding atmosphere, e.g. a protective gas or a specific humidity, under specific radiation conditions, e.g. shielded against visible light, in the dark or under defined irradiation;

measuring or analysing the sample, in particular analysing by means of a non-invasive and/or invasive treatment of the sample, in particular in order to measure at least one or more chemical, physical, biochemical and/or medical properties of the sample, in particular counting of cells by means of a cell counter;

handling of the sample, in particular changing at least one property of the sample, in particular by means of non-invasive and/or invasive treatment of the sample.

This treatment is, in particular, under program control, using at least one program parameter.

In particular, this treatment is brought about in accordance with at least one control parameter which determines the treatment of the laboratory sample by means of the treatment apparatus. A control parameter can set a period of time, a moment in time, a specific sample volume and/or metering volume, a specific sample temperature, etc. A control parameter can relate to the automatic use of a specific transport head, a specific type of transport container, a specific type of sample container, one or more individual samples or of specific positions of these components in the workspace. A control parameter can relate to the treatment of an individual sample or the treatment of a plurality or multiplicity of samples.

A user can establish the exchange of first data with a laboratory instrument by means of a user interface apparatus, for the purpose of inputting first data or retrieving first data from the laboratory instrument. Every user may use the same user interface apparatus, or a plurality of users can establish a first data connection with the laboratory instrument by means of different user interface apparatuses. A user interface apparatus can be a component of a laboratory instrument. A user interface apparatus can be a component of a control apparatus of the laboratory instrument, in particular the first control apparatus.

A user interface apparatus preferably comprises in each case: a control apparatus for a user interface apparatus, also referred to as the third control apparatus; a communication apparatus of the user interface apparatus, also referred to as the third communication apparatus, for establishing a data connection to the laboratory instrument by means of an interface apparatus of same; an input apparatus for acquiring user inputs of a user; an output apparatus, in particular an indication unit and/or a display, for outputting information to the user. Here, the control apparatus of the user interface apparatus is preferably configured to interchange data with the laboratory instrument via the first data connection, preferably by executing a control program, also referred to as a third control program.

The term "instrument-controlled treatment" means that the treatment of the at least one laboratory sample is at least partly controlled, in particular performed, by the laboratory instrument. To the extent that the treatment is controlled and/or carried out by the laboratory instrument, said treatment in this respect is, in particular, not controlled and/or performed by the user, in particular not controlled and/or performed manually by the user.

An instrument-controlled treatment is furthermore preferably understood to mean that the treatment is at least partly controlled, in particular performed, by the laboratory instrument as a function of at least one user input. The user input may occur prior to the start of the treatment and/or during the treatment. The user input preferably occurs using a user interface apparatus, which is preferably a component of the laboratory instrument or which is provided separately from the laboratory instrument and signal connected to the control apparatus of the laboratory instrument and/or to the control apparatus of the access control device. The user input serves, in particular, for entering at least one parameter, the value of which influences and/or controls the treatment. This parameter can, in particular, be a program parameter.

The "instrument-controlled treatment" denotes, in particular, the at least partly automated treatment. In the case of a partly automated treatment, it is possible, in particular, for the treatment to be performed in such a way that, after the treatment has started and before the treatment is complete, there is at least one user input, by means of which the user can influence the current treatment, in particular by virtue of said user e.g. responding to an automatic query brought about by means of a user interface apparatus of the laboratory instrument, in particular by virtue of confirming or denying an input or undertaking other inputs. In the case of the partly automated treatment, it is possible, in particular, for the treatment to have a plurality of treatment steps which, in particular, are performed automatically and successively in time and which have at least one treatment step that requires a user input, which, in particular, is brought about via a user interface apparatus.

An instrument-controlled treatment is preferably a program-controlled treatment, i.e. a treatment controlled by a program. A program-controlled treatment of a sample should be understood to mean that the process of treatment substantially takes place by working through a plurality or multiplicity of program steps. Preferably, the program-controlled treatment takes place using at least one program parameter, in particular at least one program parameter selected by the user. A parameter selected by a user is also referred to as a user parameter. The program-controlled treatment preferably takes place with the aid of a digital data processing apparatus which, in particular, may be a component of the control apparatus of the laboratory instrument. The data processing apparatus can comprise at least one processor, i.e. a CPU, and/or at least one microprocessor. The program-controlled treatment is preferably controlled and/or performed in accordance with the prescriptions of a program, in particular a control program. In particular, substantially no user activity is required in the case of a program-controlled treatment, at least after acquisition of the program parameters required from the user.

A module is an instrument which is separate from other instruments and/or an instrument which can be separated from the other instrument, in particular the laboratory instrument. A laboratory instrument may comprise a connection apparatus, by means of which the module can be connected to the laboratory instrument, in particular by means of a connection which is detachable by the user. A module may be portable, i.e. transportable by a user. The module can also be securely connected to the laboratory instrument. The modular design offers advantages during the production of laboratory instruments. A portable module offers greater flexibility when using a laboratory instrument.

Further preferred configurations of the laboratory apparatus according to the invention and method according to the invention emerge from the following description of the exemplary embodiments in conjunction with the figures and the description thereof. If nothing else is described or if nothing else emerges from the context, the same components of the exemplary embodiments are substantially characterized by the same reference signs. In detail:

FIG. 2a shows a front perspective view of an incubator according to FIG. 1a.

FIG. 2b shows a back perspective view of the incubator of FIG. 2a.

Figure 1A:
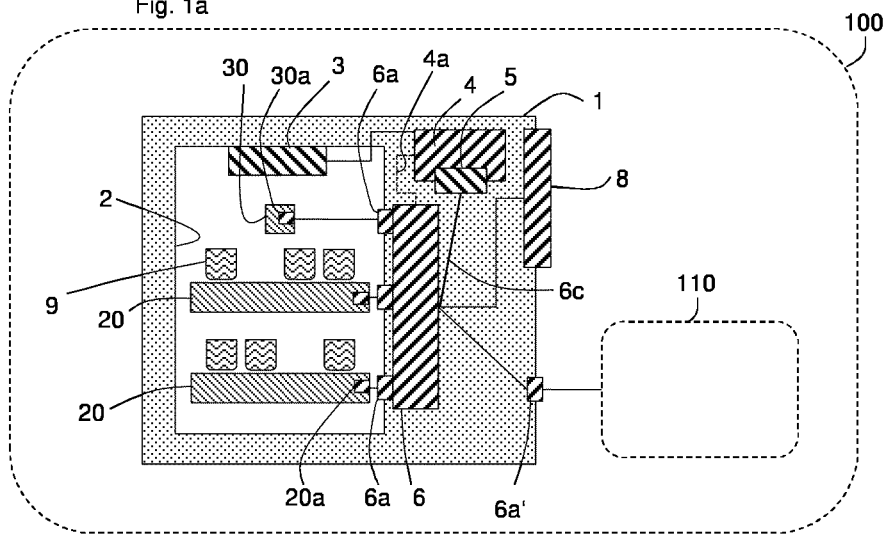
FIG. 1a shows a laboratory instrument according to an embodiment of the present invention, being an incubator.

FIG. 1a shows a laboratory instrument 1 according to an embodiment of the present invention, for working on laboratory samples 9 using a data exchange of data within a laboratory instrument network 100. The laboratory instrument network 100 is substantially a non-hierarchical network, having a peer-to-peer configuration for the most network instruments according to the definitions of the present invention. Hot-plugging is possible, which means that adding or removing any network instrument, in particular an insertable instrument 20, 30 or a user interface apparatus 8, from the network is possible without significantly interrupting the functionality of the laboratory instrument network 100.

A part 120 (similarly shown in FIG. 1g for the embodiment of FIG. 1e) of the laboratory network 100 in FIG. 1a includes those network instruments, which are physically arranged at least in part inside the incubator. Another part 110 of the laboratory network 100 includes those network instruments, which are separated from the incubator and connected to a dedicated port 6a' of the Ethernet switch 6. The user interface apparatus 8 is also a network instrument and is connected to the switch 6. The first control apparatus 4 is connected to the switch 6, but is not visible for the network instruments of the external part 110 of the network 100. This is because of the particular configuration of a router (not shown) inside the user interface 8, which implements VLAN technology. The router hides the control apparatus 4 against the other network instruments of the network 100, which are communicating using Peer-to-Peer technology. Said separation is realized by the VLAN, which is configured by the control apparatus 4 in communication with switch 6 via the SPI line 4a (FIG. 1a). The router provides two virtual network adapters via the physical network adapter 5 to provide a connection to either the part 110 or the part 120 of network instruments. The user interface apparatus 8 can reach the network parts 110 and 120 via the two virtual network adapters. Furthermore, the router ensures that network instruments of the external part 110 of the network can communicate with the visible network instruments of network part 120 via the user interface apparatus 8. Generally, said router may not be part of the user interface apparatus and may be part of the switch 6 or the control apparatus 4.

The laboratory instrument network, in the present embodiment, includes the following internal and external network instruments, as further explained hereinafter, wherein internal instruments are mounted or integrated into the laboratory instrument and external instruments are arranged outside the laboratory instrument: the first control apparatus, representing the laboratory instrument 1; the shelves 20; the temperature calibration device 30; and any external network instruments comprised by the external part 110 of the laboratory instrument network 100. The network interface apparatus 6 forms a physical central device of a Star topology network 100, which is illustrated in FIG. 1c. Internal and external network instruments can be added by hot plugging to the network interface apparatus 6 via the connectors 6a.

It is noted that, in a further preferred embodiment, any connections and connectors to external network instruments could be omitted at the laboratory instrument. In this case, the laboratory instrument would comprise only the internal network instruments 4, 20, 30, 8.

The laboratory instrument is a laboratory incubator 1, here a CO2 incubator, which is a microprocessor-controlled instrument designed for cell culture. The laboratory incubator 1 has a cuboid working chamber, forming the incubator chamber 2, which is schematically shown as a rectangle in a light color, in FIG. 1. The direct-heated, fanless working chamber 2 is designed to provide high humidity levels, minimal vibration and precisely-regulated atmosphere of temperature and gas(ses) required for cell growth in T-flasks, microplates, and other cultureware. They are intended for indoor laboratory use, only.

Figure 2A:
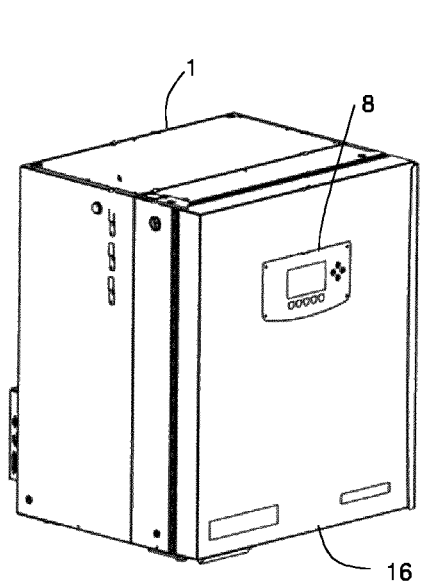
Figure 2B:
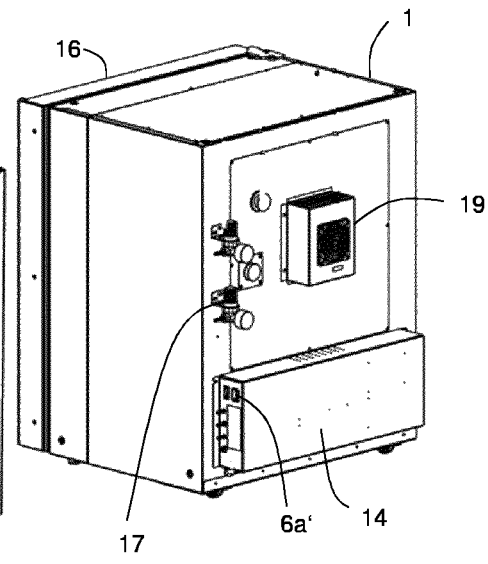

The incubator chamber 2 is formed by a front wall, a rear wall, two lateral walls, a bottom wall and a top wall, which are integrally formed from metal. The front wall is a door 16, as shown exemplarily in FIGS. 2a and 2b, which is provided for hermetically closing the working chamber in a closed position, to protect the atmosphere inside the incubator chamber against external interferences. Connectors 17 for gas ($CO_2$, $O_2$) are located on a back side of the incubator 1, FIG. 2b. A supplemental housing 14 may host the electronics of the laboratory instrument 1, which may include the first control apparatus 4 and the network adapter 5, for example. The dimensions of the incubator chamber are, for example, 54 cm in width, 70 cm in height, 45 cm in depth, having a volume of about 175 liters. Compared to said values, the values of typical laboratory instruments dimensions and volumes may be different, for example by factors between 0.2 to 5.

The incubator 1 is configured to keep the air inside the working chamber at a defined temperature between 10° C. and 50° C., a defined humidity of 95%, for example, and at a defined CO2 content value between 0.2% and 20%. This is achieved by a temperature adjusting device for direct-heating of the working chamber 2, a water vapor control (not shown) and a CO2 input valve, which form three treatment apparatuses for performing the respective treatment of the laboratory samples housed in the working chamber and which are exposed to the climate of the defined atmosphere inside the incubator chamber. In FIG. 1a, the temperature adjusting device 3 is schematically shown as a component in thermal contact with the working chamber 2.

The incubator has a first control apparatus 4 for processing data and for controlling the treatment apparatus 3 using a control program, inter alia. The incubator 1 also has a user interface apparatus 8, connected to the control apparatus 4 via the Ethernet switch 6, for receiving user inputs and for presenting information on a display of the user interface 8. The user interface apparatus 8 acts as a network instrument of the laboratory instrument network 100. The user interface apparatus 8 is a module, which may be firmly mounted or releasably connected to the incubator 1—typically to a front wall of the housing or the door. Providing the module offers advantages for the fabrication of the one or more laboratory instruments, in particular because different laboratory instruments may be provided with the same type of module.

The incubator 1 is configured to determine position data representing the relative position of the one or more insertable instruments 20, 30 inside the working chamber 2. The Ethernet switch is operated using a Serial Peripheral Interface (SPI) connection 4a, which allows the first control apparatus 4 and the Ethernet switch 6 to exchange control data, in particular meta-data, which are assigned to a data exchange between the control apparatus 4 and the Ethernet switch via the standard Ethernet connection 6c. Any meta data required may indicate the port of the switch, to which the particular insertable instruments are connected. A data exchange between the control apparatus 4 and the network interface apparatus 6 does not mandatory use the connector 6c. Any data exchange involving the insertable instrument communicating via the network interface apparatus 6 may leave such meta data in the network interface apparatus 6. The control apparatus 4 may request receiving said meta data via connection 4a in order to receive the information required for determining the port of the network interface apparatus 6 to which a specific insertable instrument is connected. A position may be represented by a unique identifying number, which is assigned to each connector 6a, 6a'.

The incubator chamber 2 is configured for housing multiple shelves 20, and a temperature calibration device 30, which are to be inserted into the working chamber in an inserted position of the insertable shelves, shown in FIG. 1a, and which are, respectively, configured to perform a work step related to the laboratory samples.

The incubator comprises a network interface apparatus 6 for providing a data connection between the insertable instruments 20, 30 and the other network instruments of the laboratory instrument network 100, for providing, in the inserted position, the exchange of data between the insertable instruments 20, 30, the first control apparatus 4 and via the router/VLAN of the UI 8 with any external network instruments in the external part 110 of the laboratory instrument network. In principle, also the control apparatus 4 is a part of the network 100, because it is part of the internal network instruments 120. The data exchange of insertable instruments 20, 30 and the control apparatus 4 does not run via the router/VLAN provided by the user interface apparatus 8. The router is utilized only for providing the data exchange involving network instruments of the external part 110 of the network. The network interface apparatus 6 is an Ethernet switch 6, in FIG. 1a. The Ethernet switch 6 uses an interface assembly having sockets 6a for connecting an Ethernet type connecting cable between the socket and an insertable instrument. Consequently, each insertable instrument has a corresponding socket 20a, 30a. The first control apparatus 4 incorporates, in the embodiment in FIG. 1a, the communication apparatus 5, and may be realized by any microcontroller having an Ethernet interface or an integrated Ethernet network adapted, respectively.

Each insertable instrument has a second communication device (not shown) for allowing the data exchange between the second control apparatus (not shown) of the insertable instrument with the rest of the laboratory instrument network via the second communication device and the socket 20a, 30a. The second communication device may be part of a second control apparatus (not shown), which may comprise integrated circuitry for controlling the calibration temperature sensor 30 or the measurement devices (not shown) of the shelf 20. The data may contain information on the allocation of sample containers placed, or not placed, on a shelf 20, wherein the measurement devices may include the optical detection of the presence or absence of a sample container at a predefined location on the shelf supporting surface, which location is optically monitored, e.g. using a light reflex measurement.

In case that the laboratory instrument network 100 comprises multiple incubators 1, the shelves 20 and the calibration device 30 can be used with each of the incubators, in a flexible way.

Figure 1B:
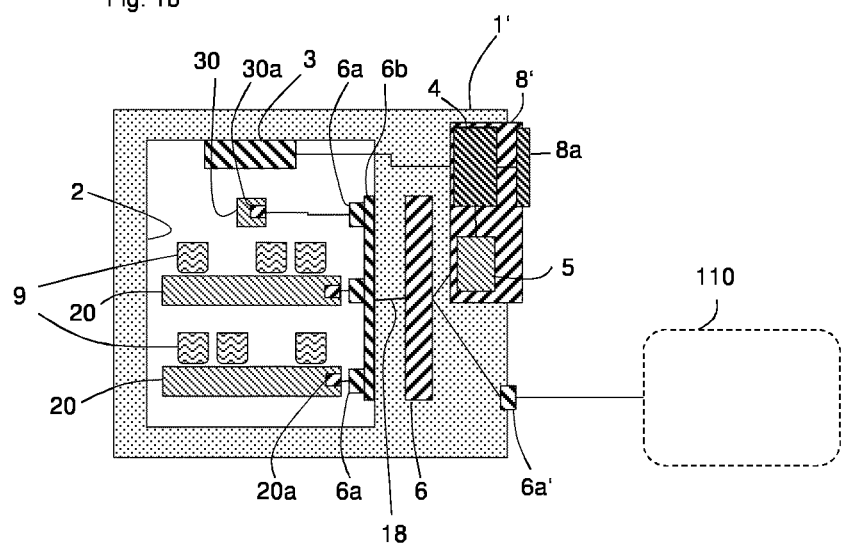
FIG. 1b shows a laboratory instrument according to another embodiment of the present invention, being an incubator.
Figure 1C:
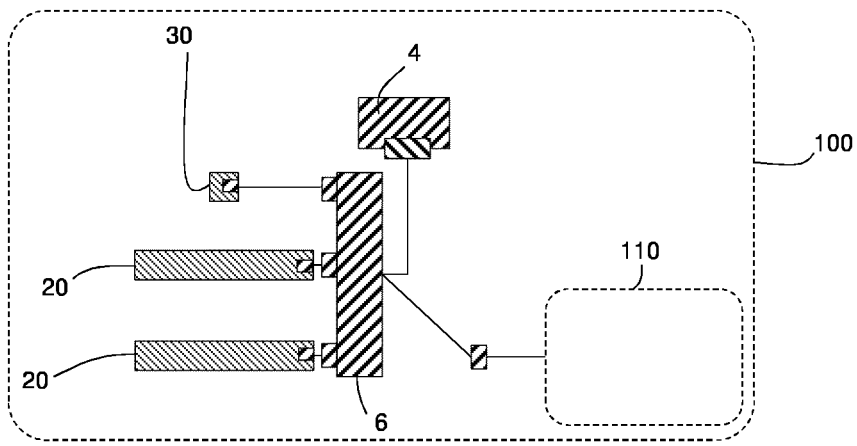
FIG. 1c shows the basic network components of the laboratory instrument network 100, including the laboratory instrument according to FIG. 1a and/or 1b.

FIG. 1b shows another preferred embodiment of a laboratory instrument 1', which basically corresponds to the design of the laboratory instrument 1 in FIG. 1a, with the following difference: the laboratory instrument 1' shows a preferred embodiment of an interface apparatus, which includes sockets 6a mounted to a socket bar 6b, which is mounted on an inner side of the working chamber 2. Inside the socket bar 6b, a cable runs from each socket 6a to a collection point of the socket bar, where the cables are bundled. The bundle 18 of the cables leads to the network interface apparatus 6, where each cable end (not shown) is connected to one of the connectors of the switch 6.

Another particular aspect of the laboratory instrument 1' in FIG. 1b is that the user interface apparatus 8' is a device, which is firmly mounted to the laboratory instrument 1'. The user interface apparatus 8 contains a touchscreen 8a, the first control apparatus 4 and the Ethernet network adapter 5, which allows the control apparatus 4, and therefore the module 8 to communicate with the residual laboratory instrument network via the Ethernet switch 6.

Figure 3:
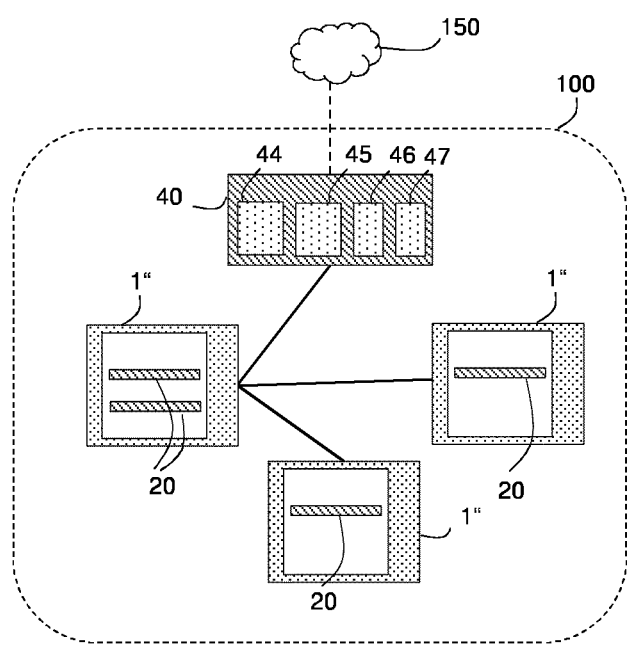
FIG. 3 shows a laboratory instrument network 100, according to an embodiment of the invention.

FIG. 3 shows a laboratory instrument network 100, according to an embodiment of the invention, comprising multiple network instruments, including three laboratory instruments 1" according to the invention, four insertable instruments 20, being a shelf respectively, and a user interface apparatus 40. The three laboratory instruments 1" and the four insertable instruments 20 are connected within the laboratory instrument network 100 to enable the exchange of data, in particular first and second data, with each other via the laboratory instrument network, in the inserted position of the insertable instrument. The incubators 1" are connected to the network interface apparatus 6, the Ethernet switch 6, of one of the incubators 1", which may be configured here according to the incubator 1 shown in FIG. 1a, or to any external network interface apparatus (i.e. any switch) outside the laboratory instruments 1".

Each network instrument can be specifically accessed on demand, e.g. using the user interface apparatus 40, with a minimum of effort regarding the transfer of control data using the Ethernet network and a minimum of energy consumption. Any second data produced inside the working chamber can be evaluated outside the working chamber, e.g. by the third control apparatus 44 of the user interface apparatus 40. This reduces the emission of wasted heat due to data processing inside the working chamber to a minimum and thus stabilizes the climatic conditions inside the working chamber.

A user interface apparatus 40 includes a control apparatus 44 for the user interface apparatus, also referred to as the third control apparatus; a communication apparatus 45 of the user interface apparatus, also referred to as the third communication apparatus, for establishing a data connection to the laboratory instrument by means of an interface apparatus of same; an input apparatus 46 for acquiring user inputs of a user and including an output apparatus 47, in particular an indication unit and/or a display, for outputting information to the user. Here, the control apparatus 44 of the user interface apparatus is configured to interchange data with the laboratory instrument 1" by the exchange of first data. The user interface apparatus 40 may also act as the user interface for controlling the network instruments of the laboratory instrument network 100. The user interface apparatus 40 also comprises a router to connect the laboratory instrument network 100 to the internet 150.

Figure 1D:
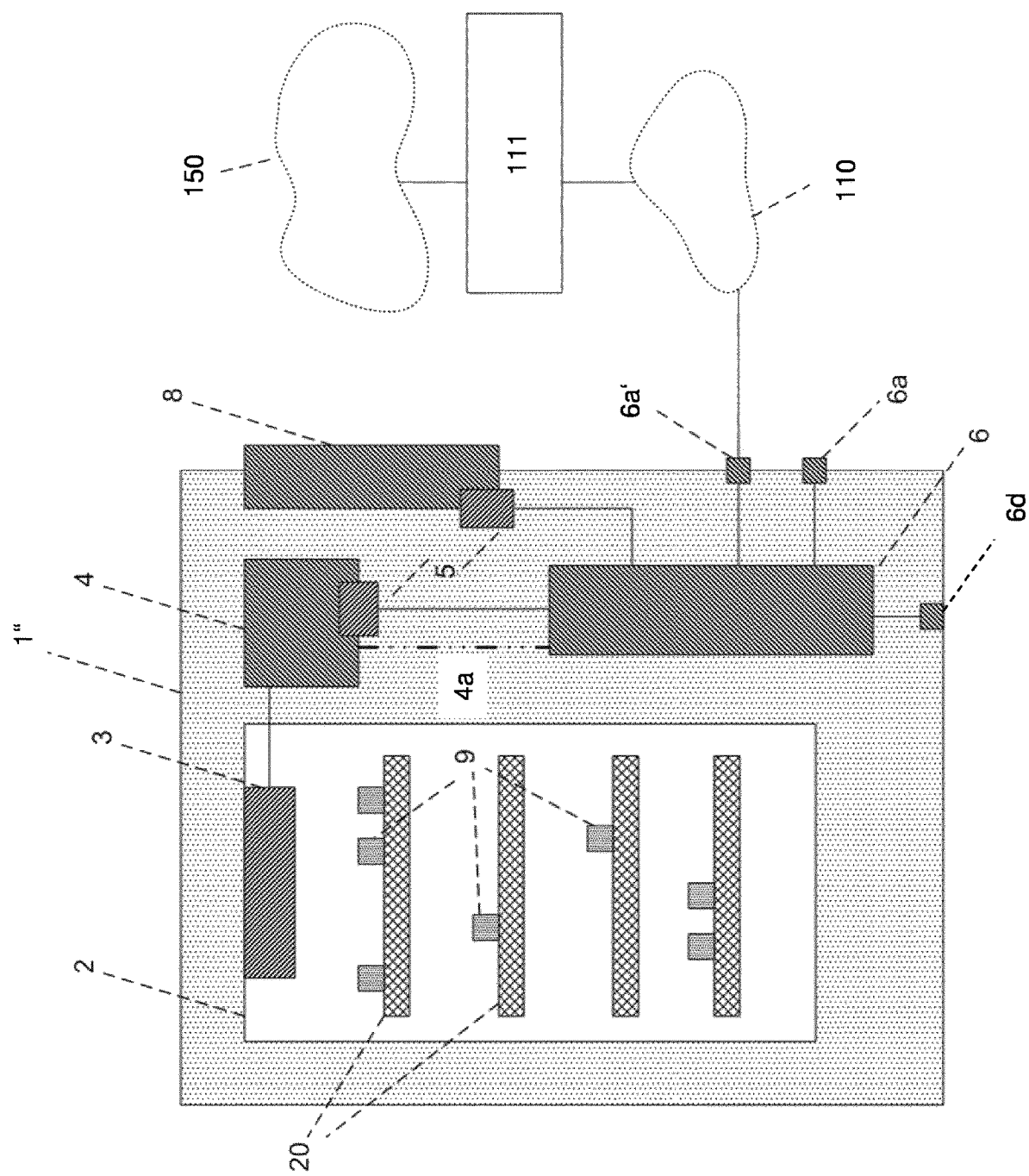
FIG. 1d shows a laboratory instrument according to another embodiment of the present invention, being an incubator.

FIG. 1d shows a laboratory instrument according to another embodiment of the present invention, being an incubator 1". The incubator 1" is part of a laboratory instrument network, including network instruments of a network part 110, which is outside the incubator 1". The incubator and the laboratory instrument network is configured in analogy to the example in FIG. 1a, with the following differences:

Also the incubator 1" is to be used with insertable instruments, which however, are not connected to internal connectors 6a (see FIG. 1a), which are arranged inside the working chamber for connecting the insertable instruments to the network interface apparatus 6, but via external connectors 6a, 6d, which are arranged at a side wall of the housing of the incubator 1" for connecting the insertable instruments to the network interface apparatus. For example, connector 6a' may be the connector for connecting network instruments of the network part 120, connector 6a may be a connector for allowing the users to connect the insertable instruments and a connector 1d may be a service port allowing a technician connecting a calibration device 50, e.g. for running a calibration described in FIG. 1e. In an application sample of the incubator 1", an external adjusting instrument 50 (see FIG. 1e), including movable sensor parts 51 and 52, is provided and is inserted partially into the working chamber 2, while the incubator door (not shown) is closed. The movable parts 51, which include the temperature sensors 53, are connected to the control apparatus 4' of the adjustment instrument 50 by way of a cable bundle 55.

The adjusting instrument 50 replaces the functionality of the calibration shelf 30 in FIG. 1a and acts as a calibration device. In case that a calibration of the incubator's 1" internal sensors (not shown) is desired, a service technician inserts the temperature sensors 53 on any available shelf 20 inside the working chamber 2 in an appropriate way. Moreover, the technician inserts the gas sensors 54 inside the working chamber. As a preferred option, this is realized in the present example by inserting a smart shelf 52 inside the working chamber. The shelf 52 contains the gas sensors 54 and a (second) control apparatus 4", as well as a communication apparatus 5. The temperature sensors 53 and the gas sensors 54 may contain a digitizer to generate measurement data from the measured signals. However, the part 51 does not contain a control apparatus, because any data processing performed by such a control apparatus may influence the local temperature around the sensors 53 and lead to measurement errors.

Figure 1E:
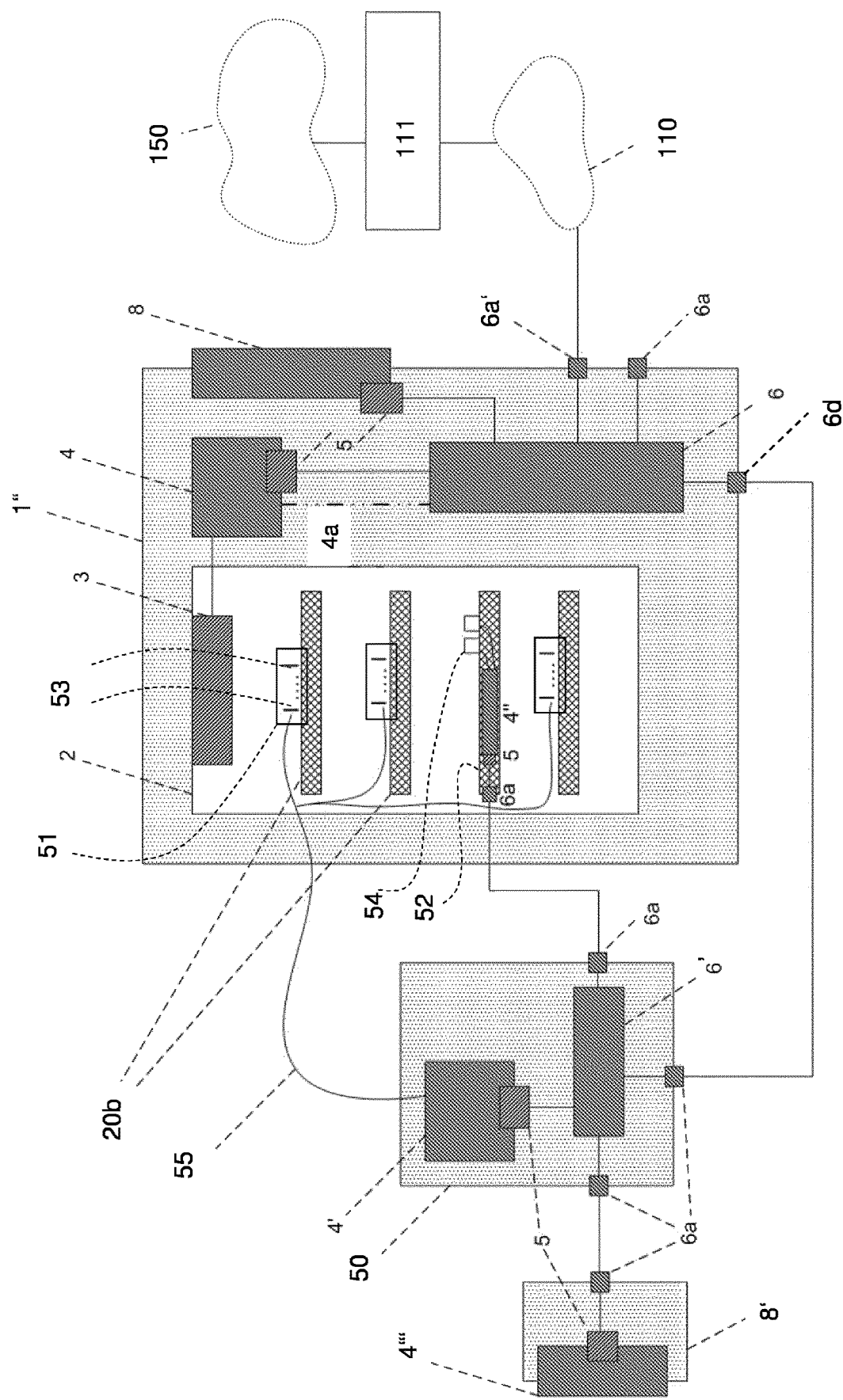
FIG. 1e shows the laboratory instrument of FIG. 1d, wherein an insertable instrument is in part inserted into the working chamber and connected to an external port of the network interface apparatus of the laboratory instrument.

In the example of FIG. 1e, the adjustment instrument 50 includes an Ethernet switch 6', which is connected to the control apparatus 4' of the adjustment instrument 50 via a communication apparatus 5. The smart shelf 52 is connected via connectors with the Ethernet switch 6'. The Ethernet switch 6' is connected via the service port 6d to the Ethernet switch 6 inside the laboratory instrument 1" for the purpose of an automated verification and adjustment process. The control program for automatically running the verification and adjustment may be executed, by choice, on any of the devices 8', 4', 8 or 4.

Optionally, a user interface apparatus 8' is provided, which may be used to control the adjustment instrument 50. The adjustment instrument 50 may also contain a user interface. The adjustment instrument 50 acts as a network instrument of the laboratory instrument network 100. Also the smart shelf 52 acts as a network instrument of the laboratory instrument network 100, which, in principle, may be connected to the Ethernet switch 6 inside the laboratory instrument 1" instead being connected to the Ethernet switch 6'.

The residual part 110 of the laboratory instrument network 100 may be connected to the internet 150 via a router 111. In FIG. 1g it is shown in a simplified scheme regarding the embodiment of FIG. 1e that the router provided by control apparatus 4 provides VLAN technology to connect the external parts 110 and internal parts 120 of network instruments 20, 30, 50, 8 inside the network 100, while the control apparatus 4 is not visible for the network instruments in 110. This was already described with reference to the embodiment of FIG. 1a. FIG. 1h shows similar information compared to FIG. 1g, but additional optional embodiments are shown how to connect network instruments 4", 20, 30, 4', 8' via the two additional switches 6' and 6''' to the network interface apparatus 6 of the incubator.

Figure 1F:
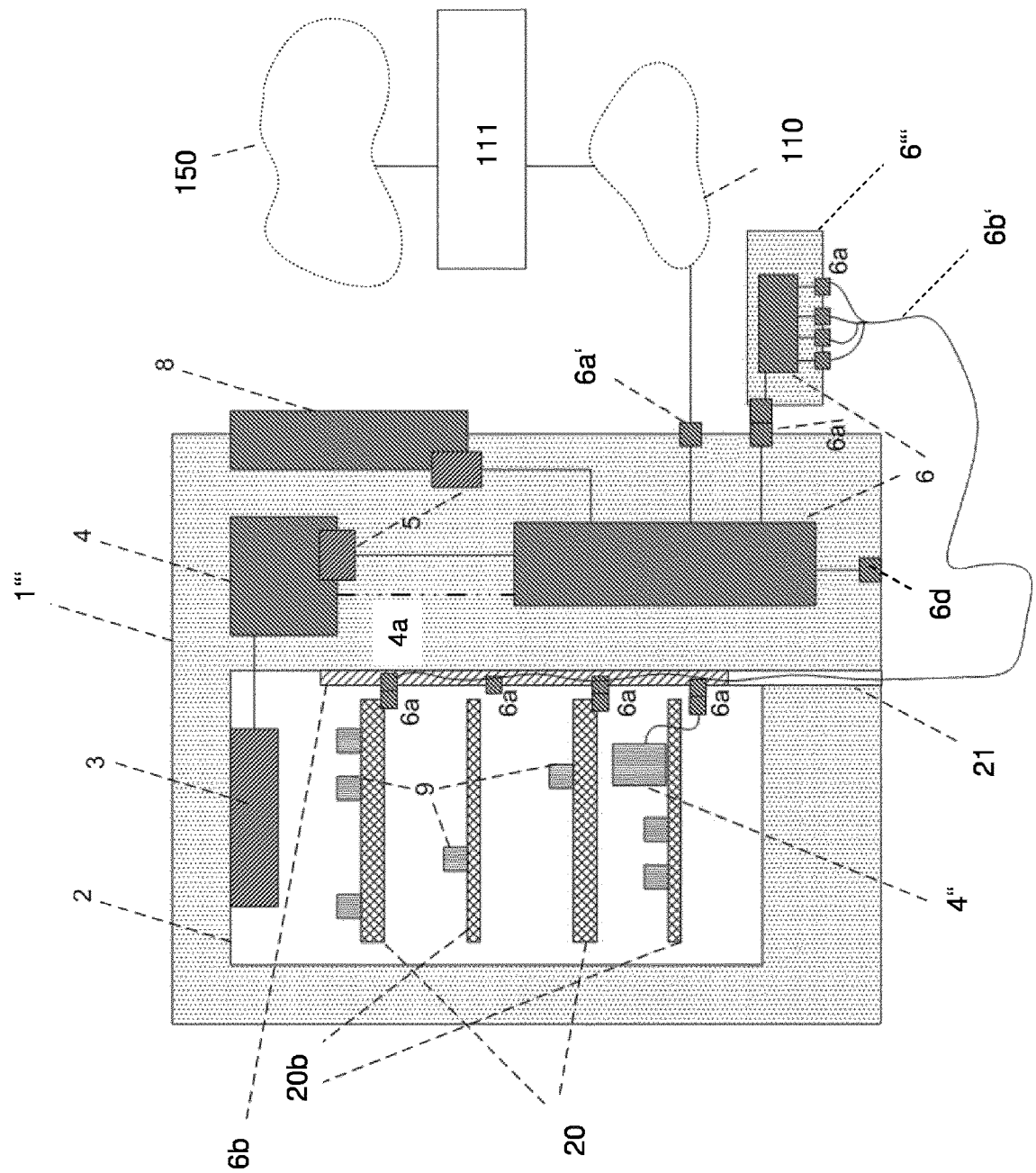
FIG. 1f shows a laboratory instrument according to another embodiment of the present invention, being an incubator.
Figure 1G:
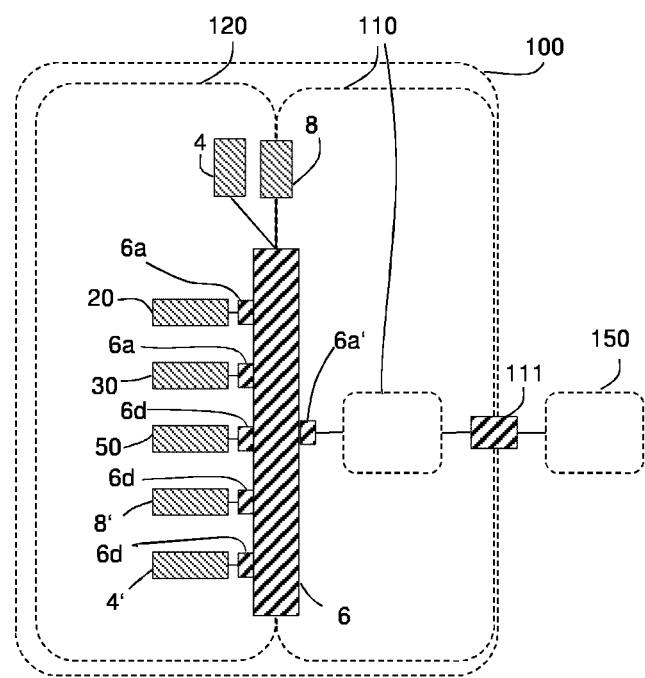
FIG. 1g shows the components of a laboratory instrument network according to a preferred embodiment of the present invention, containing at least one laboratory instrument according to the present invention.
Figure 1H:
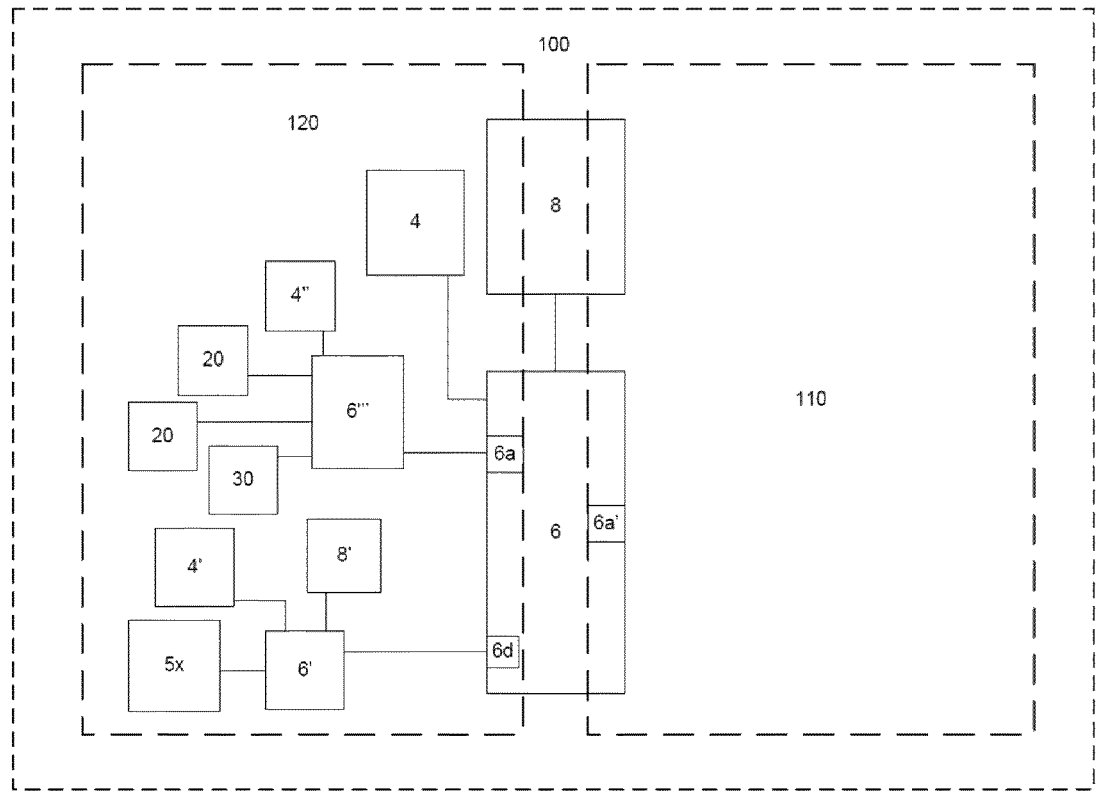
FIG. 1h shows the components of laboratory instrument network according to another preferred embodiment of the present invention, containing at least one laboratory instrument according to the present invention.

FIG. 1f shows a laboratory instrument according to another embodiment of the present invention, being an incubator 1'''. Inside the working chamber 2, a socket bar 6b is mounted, carrying the connectors 6a for inserting and connecting the smart shelves 20, being network instruments. Standard shelves 20b, not being network instruments, may be also provided in the working chamber 2. The incubator 1''' contains an access port 21, which connects the inside of the working chamber 2 with the surrounding environment of the laboratory instrument 1'''. A cable bundle 6b' connects the connectors 6a of the socket bar 6b through the access port with the connectors 6a of an external Ethernet switch box 6''', which is connected to the housing of the incubator 1'''. The external Ethernet switch box 6''' is connected to the internal Ethernet switch 6 of the incubator 1''' via another external connector 6a. It is generally also possible to connect an insertable instrument 20 directly with an external connector 6a of the laboratory instrument, without using the external Ethernet switch box 6'''.

Figure 4:
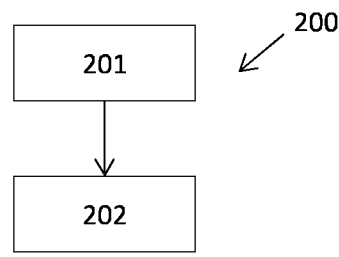
FIG. 4 shows an embodiment of the method according to the invention.

FIG. 4 shows an embodiment of the method according to the invention. The method 200 for working on laboratory samples using a laboratory instrument network comprising at least one laboratory instrument according to the invention and at least one insertable instrument, which is configured to perform a work step related to the laboratory samples involving the exchange of second data within the laboratory instrument network according to the invention, includes the steps:

placing at least one insertable instrument in the working chamber of the at least one laboratory instrument (201);
connecting the at least one insertable instrument with the network interface apparatus of the at least one laboratory instrument and establishing the data exchange between the at least one insertable instrument and the laboratory instrument network (202).

The invention claimed is:

1. Laboratory instrument (1; 1'; 1"; 1'") for working on laboratory samples (9), the laboratory instrument comprising:
   a working chamber (2) for housing the laboratory samples, wherein the working chamber (2) is configured for housing at least one insertable instrument (20; 30);
   the at least one insertable instrument (20; 30), which is removably inserted into the working chamber in an inserted position and is configured to perform a work step inside the working chamber involving the exchange of data;
   a treatment apparatus (3) for performing a treatment of the laboratory samples housed in the working chamber;
   a first control apparatus (4) configured for processing first data and for controlling the treatment apparatus; and
   a network interface apparatus (6), which is configured to provide, in the inserted position of the insertable instrument, a data connection between at least two network instruments of a laboratory instrument network (100), which network instruments are taken from the group of network instruments including at least the first control apparatus (4) and the at least one insertable instrument (20; 30), the network interface apparatus (6) being connected to the first control apparatus and to the at least one insertable instrument;
   wherein the at least one insertable instrument (20: 30) comprises a second control apparatus comprising a data processing unit programmed for processing second data, which are exchanged with the at least one insertable instrument (20; 30), the laboratory instrument contains a network router configured to connect the at least one insertable instrument (20; 30) of the laboratory instrument network (100) with an external network (150) and to exchange the second data between the at least one insertable instrument (20; 30) and the external network (150), and the network interface apparatus includes a network switch.

2. Laboratory instrument according to claim 1, wherein the network interface apparatus comprises an Ethernet hub or an Ethernet switch.

3. Laboratory instrument according to claim 1, wherein the laboratory instrument has one or more of the following configurations:
   a) the at least one insertable instrument (20; 30) communicates with the first control apparatus (4) via the network interface apparatus (6);
   b) the laboratory instrument comprises at least two insertable instruments (20; 30) inserted into the working chamber (2), which communicate with each other via the network interface apparatus (6).

4. Laboratory instrument according to claim 1, which comprises a first communication apparatus (5) configured to exchange data with the first control apparatus (4) and to provide communication between the first control apparatus (4) and the network interface apparatus (6).

5. Laboratory instrument according to claim 1, which is or comprises, respectively: a laboratory incubator, a laboratory sample mixer, a laboratory sample shaker, a laboratory freezer, or an automated pipetting apparatus, a thermal cycler.

6. Laboratory instrument according to claim 1, wherein the at least one insertable instrument comprises a second control apparatus (4") configured to exchange, in the inserted position of the at least one insertable instrument, the data with the laboratory instrument network.

7. Laboratory instrument according to claim 1, which comprises a user interface apparatus, which includes a user interface for allowing a user to input data, the user interface comprising a third control apparatus for processing the data and configured to exchange the data between the third control apparatus and the laboratory instrument network.

8. Laboratory instrument according to claim 1, wherein the at least one insertable instrument has at least a first part and a second part, which are connected to each other, wherein the first part is inserted into the working chamber and the second part is not inserted in the working chamber in the inserted position of the insertable instrument.

9. Laboratory instrument according to claim 1, which is configured for locating the presence or absence, and/or at least one position of the at least one insertable instrument, in the inserted position.

10. Laboratory instrument according to claim 1, wherein the at least one insertable instrument (20; 30) is a carrier device for carrying at least one laboratory sample, and the working chamber is configured to receive the at least one carrier device.

11. Laboratory instrument according to claim 10, wherein the carrier device is a shelf having a shelf surface to be horizontally arranged and mounted in the working chamber.

12. Laboratory instrument network (100) comprising
   at least one laboratory instrument (1) according to claim 1,
   wherein the laboratory instrument network (100) includes one or more of the following configurations:
   i) the laboratory instrument comprises at least two insertable instruments (20; 30) inserted into the working chamber (2), which communicate with each other via the network interface apparatus (6); and/or
   ii) the laboratory instrument network includes at least one external network instrument located outside the laboratory instrument and being connected to the network interface apparatus (6), wherein the at least one insertable instrument (20; 30) and external network instrument communicate via the network interface apparatus (6).

13. The laboratory instrument network according to claim 12, which, for the purpose of addressing a network instrument, is configured to have a link-local address be assigned to each network instrument, which are connected to the laboratory instrument network, the link-local address being a link-local IP address of an Ethernet network.

14. The laboratory instrument network according to claim 12, wherein the network router of the at least one laboratory instrument and the network switch are configured to
   implement at least one Virtual Local Area Network (VLAN), including one internal VLAN, which
   connects the at least one laboratory instrument and the at least one insertable instrument,
   hides the network instruments connected by the internal VLAN against an external network;
   connect the laboratory instrument network with the external network to enable data exchange.

15. Laboratory instrument according to claim 1, the network switch being an Ethernet switch, to which the network instruments are connected, wherein the network rout-er and the Ethernet switch are configured for implementing at least one internal VLAN, the internal VLAN being configured to connect the network instruments, and implementing one external VLAN, the external VLAN being configured to hide the network instruments connected by the internal VLAN against an external network, which is connected to the Ethernet switch.

16. Laboratory instrument according to claim 1, wherein the laboratory instrument comprises a user interface apparatus (8) forming a network instrument being connected to the network interface apparatus (6).

17. Laboratory instrument according to claim 16, wherein the network router is part of the user interface apparatus (8).

18. Laboratory instrument according to claim 1, wherein the network router is part of the network interface apparatus (6) or of the first control apparatus (4).

* * * * *

UNITED STATES PATENT AND TRADEMARK OFFICE
CERTIFICATE OF CORRECTION

PATENT NO. : 12,117,458 B2
APPLICATION NO. : 16/614324
DATED : October 15, 2024
INVENTOR(S) : Steffen Buller et al.

Page 1 of 1

It is certified that error appears in the above-identified patent and that said Letters Patent is hereby corrected as shown below:

On the Title Page

Item (22): "May 15, 2018" should be changed to --May 14, 2018--

Signed and Sealed this
Eleventh Day of March, 2025

Coke Morgan Stewart
*Acting Director of the United States Patent and Trademark Office*